United States Patent
Manepalli et al.

(10) Patent No.: US 10,375,646 B2
(45) Date of Patent: Aug. 6, 2019

(54) COORDINATION BETWEEN APPLICATION AND BASEBAND LAYER OPERATION

(71) Applicant: Apple Inc., Cupertino, CA (US)

(72) Inventors: Venkateswara Rao Manepalli, Sunnyvale, CA (US); Tarik Tabet, Los Gatos, CA (US); Madhusudan Chaudhary, Campbell, CA (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 14/684,593

(22) Filed: Apr. 13, 2015

(65) Prior Publication Data
US 2015/0304955 A1    Oct. 22, 2015

Related U.S. Application Data

(63) Continuation of application No. 14/683,984, filed on Apr. 10, 2015, now Pat. No. 9,906,977, which is a
(Continued)

(51) Int. Cl.
*H04W 52/02* (2009.01)
*H04W 72/04* (2009.01)
(Continued)

(52) U.S. Cl.
CPC ....... *H04W 52/0274* (2013.01); *H04W 76/28* (2018.02); *H04W 28/18* (2013.01);
(Continued)

(58) Field of Classification Search
CPC .................................................. H04W 52/02
See application file for complete search history.

(56) References Cited

U.S. PATENT DOCUMENTS

| 8,538,450 | B2 | 9/2013 | Zhang et al. |
| 8,792,423 | B2 | 7/2014 | Lu et al. |

(Continued)

FOREIGN PATENT DOCUMENTS

| CN | 101194449 A | 6/2008 |
| CN | 101242622 A | 8/2008 |

(Continued)

OTHER PUBLICATIONS

English translation of JP 2011-254159 (cited on IDS dated May 23, 2016), Fujitsu Toshiba Mobile Communication, Dec. 15, 2011, pp. 1-25. (Year: 2011).*

(Continued)

*Primary Examiner* — Jason E Mattis
*Assistant Examiner* — Hong Shao
(74) *Attorney, Agent, or Firm* — Meyertons Hood Kivlin Kowert and Goetzel PC; Jeffrey C. Hood

(57) ABSTRACT

This disclosure relates to techniques for scheduling radio resource control connections between a wireless device and a network element of a network in advance. According to some embodiments, a wireless device may provide an indication of one or more types of upcoming data traffic to the network element. The network element may schedule one or more radio resource control connections for the wireless device based at least in part on the indication of one or more types of upcoming data traffic. The network element may provide an indication of the scheduled radio resource control connection(s) to the wireless device. The wireless device and the network may establish the scheduled radio resource control connection at the scheduled time.

19 Claims, 12 Drawing Sheets

Related U.S. Application Data continuation of application No. 14/683,493, filed on Apr. 10, 2015, now Pat. No. 9,497,771.

(60) Provisional application No. 61/981,447, filed on Apr. 18, 2014.

(51) Int. Cl.
*H04W 76/28* (2018.01)
*H04W 28/18* (2009.01)
*H04W 76/27* (2018.01)

(52) U.S. Cl.
CPC ......... *H04W 76/27* (2018.02); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/23* (2018.01); *Y02D 70/24* (2018.01); *Y02D 70/26* (2018.01)

(56) References Cited

U.S. PATENT DOCUMENTS

| | | | |
|---|---|---|---|
| 2003/0031210 A1 | 2/2003 | Harris | |
| 2007/0153727 A1 | 7/2007 | McBeath | |
| 2007/0258364 A1 | 11/2007 | Wigard | |
| 2008/0267165 A1* | 10/2008 | Bertrand | H04W 56/0005 370/350 |
| 2009/0161662 A1* | 6/2009 | Wu | G06F 1/3203 370/352 |
| 2009/0180414 A1* | 7/2009 | Maeda | H04B 7/2643 370/311 |
| 2010/0074200 A1 | 3/2010 | Li | |
| 2010/0077083 A1* | 3/2010 | Tran | H04L 67/325 709/227 |
| 2012/0002614 A1 | 1/2012 | Ekici et al. | |
| 2012/0157033 A1* | 6/2012 | Ou | H04W 74/04 455/404.1 |
| 2012/0163313 A1 | 6/2012 | Jung et al. | |
| 2012/0207069 A1 | 8/2012 | Xu | |
| 2013/0039287 A1 | 2/2013 | Rayavarapu et al. | |
| 2013/0044702 A1* | 2/2013 | Jayaraman | H04W 48/06 370/329 |
| 2013/0107782 A1* | 5/2013 | Anas | H04W 72/1231 370/311 |
| 2013/0155852 A1* | 6/2013 | Paredes | H04W 28/16 370/230 |
| 2013/0163537 A1 | 6/2013 | Anderson | |
| 2013/0194941 A1 | 8/2013 | Lu | |
| 2013/0194991 A1* | 8/2013 | Vannithamby | H04W 72/0493 370/311 |
| 2013/0210420 A1* | 8/2013 | Deivasigamani | H04W 52/0245 455/423 |
| 2013/0235780 A1* | 9/2013 | Kim | H04W 52/0216 370/311 |
| 2013/0250828 A1* | 9/2013 | Chou | H04W 72/0413 370/311 |
| 2013/0294307 A1 | 11/2013 | Johannson et al. | |
| 2013/0301602 A1 | 11/2013 | Uchino et al. | |
| 2014/0018085 A1* | 1/2014 | Young | H04W 52/0235 455/450 |
| 2014/0036748 A1* | 2/2014 | Mukherjee | H04W 52/0212 370/311 |
| 2014/0092733 A1 | 4/2014 | Johansson et al. | |
| 2014/0092734 A1 | 4/2014 | Ljund | |
| 2014/0105087 A1 | 4/2014 | Gupta et al. | |
| 2014/0241227 A1 | 8/2014 | Wu et al. | |
| 2014/0243038 A1 | 8/2014 | Schmidt et al. | |
| 2014/0334369 A1 | 11/2014 | Kaikkonen et al. | |
| 2015/0003361 A1 | 1/2015 | Palat et al. | |
| 2015/0009815 A1 | 1/2015 | Hsu et al. | |
| 2015/0050935 A1 | 2/2015 | Maniatis et al. | |
| 2015/0140983 A1 | 5/2015 | Cosimini et al. | |
| 2015/0141030 A1* | 5/2015 | Basu-Mallick | H04W 76/36 455/452.1 |
| 2015/0201375 A1* | 7/2015 | Vannithamby | H04W 24/04 370/311 |
| 2015/0230179 A1 | 8/2015 | Gupta et al. | |
| 2015/0237566 A1 | 8/2015 | Lee et al. | |
| 2015/0358138 A1 | 12/2015 | Hwang | |

FOREIGN PATENT DOCUMENTS

| | | |
|---|---|---|
| JP | 20033298493 | 10/2003 |
| JP | 2011254159 A | 12/2011 |
| JP | 2012134973 A | 7/2012 |
| JP | 2013537733 A | 10/2013 |
| WO | WO2007120113 | 10/2007 |
| WO | 2007145035 | 12/2007 |
| WO | 2012000547 | 1/2012 |
| WO | 2013025732 | 2/2013 |
| WO | 2013044415 A1 | 4/2013 |
| WO | 2013138043 A1 | 9/2013 |
| WO | 2013139299 A1 | 9/2013 |
| WO | 2013190364 A2 | 12/2013 |
| WO | 2014020128 A1 | 2/2014 |
| WO | 2014022847 A1 | 2/2014 |

OTHER PUBLICATIONS

Japanese Office Action, Application No. 2015-085366, dated Mar. 3, 2016, 7 pages.
Intel, "Extending DRX based on UE Low Power Preference Indication", SA WG2 Meeting #93, Oct. 8-12, 2012, 5 pages, Sofia, Bulgaria.
Japanese Office Action, Application No. 2015-085367, dated Mar. 3, 2016, 8 pages.
Japanese Office Action, Application No. 2015-085368, dated Mar. 29, 2016, 13 pages.
Notice of Allowance, Japanese Patent Application No. 2015-085367, dated Apr. 27, 2017, 13 pages.
Office Action, German Patent Application No. 10 2015 206 976.1, dated Jun. 26, 2017, 6 pages.
Office Action, Chinese Application No. 201510182419.8, dated Feb. 24, 2018, 7 pages.
Office Action, Chinese Application No. 201510181710.3, dated Apr. 6, 2018, 11 pages.
Second Office Action, Chinese Application for Invention No. 201510181896.2, dated Jul. 19, 2018, 17 pages.
Office Action, German Patent Application No. 10 2015 206 888.9, dated Jun. 2, 2017, 4 pages.

\* cited by examiner

COORDINATION BETWEEN APPLICATION AND BASEBAND LAYER OPERATION

PRIORITY CLAIM

The present application is a continuation of U.S. application Ser. No. 14/683,984 titled "Deterministic RRC Connections" and filed on Apr. 10, 2015, which is a continuation of U.S. application Ser. No. 14/683,493 titled "Deterministic RRC Connections and filed on Apr. 10, 2015, which claims benefit of priority to U.S. Provisional Application No. 61/981,447 titled "Wireless Device Power Consumption Optimizations" and filed on Apr. 18, 2014, all of which are hereby incorporated by reference in their entirety as though fully and completely set forth herein.

FIELD

The present application relates to wireless devices, including to apparatuses, systems and methods for deterministically scheduling and establishing radio resource control connections of wireless devices based on application characteristics.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of apparatuses, systems, and methods for reducing the power consumption of wireless devices, in particular based on application traffic characteristics.

According to some embodiments, application traffic patterns of a wireless device may be used to schedule radio resource control (RRC) connections between the wireless device and a cellular base station in advance.

For example, in some instances a wireless device may monitor the type or types of network data traffic being exchanged by the wireless device, and may categorize different applications into various categories. When the wireless device observes that data from a particular application or application type is ready for uplink transmission (or possibly when the wireless device predicts that such data will be ready for uplink transmission soon), the wireless device may provide an indication of the application, application type, data category, and/or other information indicative of the upcoming traffic type to its serving base station.

Note that categorizing may be based on any of various possible data traffic characteristics. Delay tolerance/scheduling window, application, application type, a customized (e.g., based on user pattern) or fixed priority level, an estimated or exact amount of data to be exchanged/an estimated or exact amount of bandwidth requested, and/or various other characteristics may be considered when classifying data traffic into classes. Thus, at least in some instances, an indication of a data traffic class may implicitly indicate any of various possible characteristics represented by that data traffic class.

The base station may receive such information from the wireless device, and at least in some instances, may further receive similar information regarding upcoming traffic type(s) from other wireless devices (e.g., devices served by the base station). Based on all of this information, and potentially based on current scheduling, estimated future load, and/or any of various other factors, the base station may be able to schedule upcoming RRC connections for each of the wireless devices. The RRC connections may be scheduled in such a manner that load on the base station is smoothed over time, in such a manner that data traffic for each device is exchanged in a manner consistent with (e.g., within) its delay tolerance, and/or in any of various other manners, as desired.

The base station may provide indications to the wireless devices of the scheduled upcoming RRC connections. For example, each wireless device may be provided with an indication (or multiple indications) of one or more scheduled upcoming RRC connections. These indications may also indicate a type of data traffic for which the RRC connection is scheduled, at least in some instances. For example, the base station might schedule one RRC connection for a wireless device at one time intended for exchange of high priority (e.g., delay intolerant) data, and schedule another RRC connection for the wireless device at another (e.g., later) time intended for exchange of low priority data.

In some instances (e.g., if a scheduled upcoming RRC connection is not immediate), the wireless device may enter (or remain in) an idle or sleep mode between receiving an indication of a scheduled upcoming RRC connection and the actual time of the scheduled upcoming RRC connection. Then at the time of the scheduled RRC connection, the wireless device may wake up.

The scheduled RRC connections may be established in a network initiated manner, at least in some embodiments. For example, at the time of a scheduled RRC connection, the base station may transmit a paging message to the wireless device. The wireless device may monitor the paging channel at that time (e.g., based on its knowledge of the scheduled RRC connection), and so may receive and respond to the paging message in such a manner as to establish the scheduled RRC connection with the base station.

The wireless device and the base station may then exchange data via the RRC connection. The type of data exchanged may include a type of data for which the RRC connection was scheduled. For example, if an indication was provided when scheduling the RRC connection that it was for high priority data, the wireless device and the base station might exchange the high priority data using the RRC connection; while if an indication was provided when scheduling the RRC connection that it was for low priority data, the wireless device and the base station might exchange the low priority data using the RRC connection. However, at least in some instances, it may be possible to exchange other types of data using the RRC connection as well, and/or it may be possible that no particular data type is specified for a scheduled RRC connection, and that any type of data may be exchanged during that scheduled RRC connection.

According to a further set of embodiments, a wireless devices and a base station may (e.g., optionally) agree to implement a feature whereby transmission of some uplink and/or downlink traffic may be selectively delayed depending on loading considerations at the base station. For example, when such a feature is enabled, lower priority data which is at least somewhat delay tolerant may be delayed under high load conditions until better load conditions are detected (or possibly until one or more other conditions occur, such as a timer expiring or a buffer fullness threshold being exceeded).

Prior to implementing such a "load-based-delay" feature, the wireless device and the base station may first signal to each other that the feature is supported on both sides, at least in some instances. If either side does not support the feature, it may be the case that neither side implements the feature. If both sides do support the feature, one or the other of the wireless device and the base station may request that the feature be enabled, and if the other of the wireless device and the base station agrees, both sides may implement the feature with respect to each other, e.g., until one or the other of the wireless device and the base station disables the feature. Alternatively, if desired, such a feature may be automatically or implicitly enabled based on each of the base station and the wireless device indicating support of the feature.

As noted above, aspects of the load-based-delay feature may be implemented by either or both of the wireless device and the base station. As one possibility, when the feature is enabled, the wireless device may monitor loading of the cell provided by the base station, and delay requesting an uplink grant for a low-priority uplink data transmission if loading is above a threshold. Once loading conditions are below the threshold (or another configured condition is met), the wireless device might then request an uplink grant and perform uplink communication with the base station.

As another possibility, when the feature is enabled, the base station may initially buffer low-priority downlink data transmission for the wireless device instead of immediately providing a downlink grant for the data. Once an uplink grant request is received from the wireless device (or another configured condition is met), the base station might then also provide a downlink grant for the downlink data in addition to providing an uplink grant in response to the uplink grant request.

According to yet a further set of embodiments, any of a variety of additional or alternative features may (e.g., optionally) be implemented for wireless communication between a wireless device and a base station.

According to one such feature, different entities of a wireless device, such as an application processor and a baseband processor of the wireless device, may provide each other with information in order to coordinate timing of transmission and reception related activities. For example, the application processor may provide information regarding next expected uplink and downlink network data communications, which may assist the baseband processor in determining when to operate actively and when to operate in a low power or sleep mode. As another example, the baseband processor may provide information regarding the timing of its network-configured transmit and receive opportunities and/or its sleeping/waking schedule. This may allow the application processor to provide application data for network communication to the baseband processor at times when it is already awake, rather than interrupting its sleep schedule with data that it may not immediately be able to transmit.

According to another such feature, one or more lower layers (e.g., MAC, RRC, etc.) of the wireless device may attempt to group control responses to received data (e.g., acknowledgement responses) with application data transmissions. For example, a timer might be initiated based on receiving data from a base station for which a control response is expected. The data may be provided to one or more upper layers (e.g., an application layer), which may or may not generate application data for transmission prior to expiration of the timer. If the upper layer does generate application data prior to expiration of the timer, the lower layer(s) may group the control information with the application data in a single uplink transmission. If the upper layer does not generate application data prior to expiration of the timer, the lower layer(s) may proceed to transmit the control information without any grouped application data.

According to another such feature, a wireless device may be able to request early entry into a discontinuous reception (DRX) mode. For example, if a wireless device expects (e.g., based on an application traffic pattern) that a sufficiently long period of data inactivity will occur that entering the DRX mode would be advantageous (e.g., from a power conservation perspective) but the inactivity timer has not yet expired, the wireless device may transmit an indication to a base station requesting early entry into the DRX mode. The base station may explicitly respond to the request instructing the wireless device to enter DRX, and the wireless device may then proceed to enter DRX. Alternatively, the wireless device may enter DRX and assume implicit assent to its early DRX entry request, according to some embodiments.

According to another such feature, a wireless device may be able to request early transition between DRX modes. For example, if a wireless device expects (e.g., based on an application traffic pattern) that a sufficiently long period of data inactivity will occur that transitioning to a different (e.g., longer) DRX mode would be advantageous (e.g., from a power conservation perspective) but the DRX short cycle timer has not yet expired, the wireless device may transmit an indication to a base station requesting early transition between DRX modes (and possibly more specifically early transition from a DRX short cycle to a DRX long cycle). The base station may explicitly respond to the request instructing the wireless device to transition to a different DRX mode (e.g., DRX long cycle), and the wireless device may then proceed to transition its DRX mode (e.g., to DRX long cycle). Alternatively, the wireless device may transition between DRX modes and assume implicit assent to its early DRX mode transition request, according to some embodiments.

According to another such feature, a wireless device may be provided by a cellular network with a choice of multiple possible configuration sets, each of which may specify configuration parameters for multiple configuration options. The wireless device may be able to select a preferred configuration set, based on its current application traffic type, pattern, or any of various other considerations, and thus compactly indicate its preference with respect to multiple configuration parameters by selecting the desired configuration set, such that the requested configuration parameters are appropriate for the current application traffic type (or other basis for configuration set selection) at the wireless device.

According to another such feature, a wireless device and a cellular network may be able to agree upon a default 'low power' configuration between the wireless device and the cellular network, which may specify configuration parameters for multiple configuration options. Once agreed upon, the wireless device may then be able to compactly request (e.g., using a single bit, potentially, or any other desired manner and amount of signaling) the 'low power' configuration and begin to use the agreed upon default 'low power' configuration in subsequent communications with the cellular network.

Note that any or all of the above-described features and embodiments may be used individually or in combination, as desired.

The techniques described herein may be implemented in and/or used with a number of different types of devices, including but not limited to cellular phones, cellular base stations, mobile management entities (MMEs) and other cellular core network entities, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
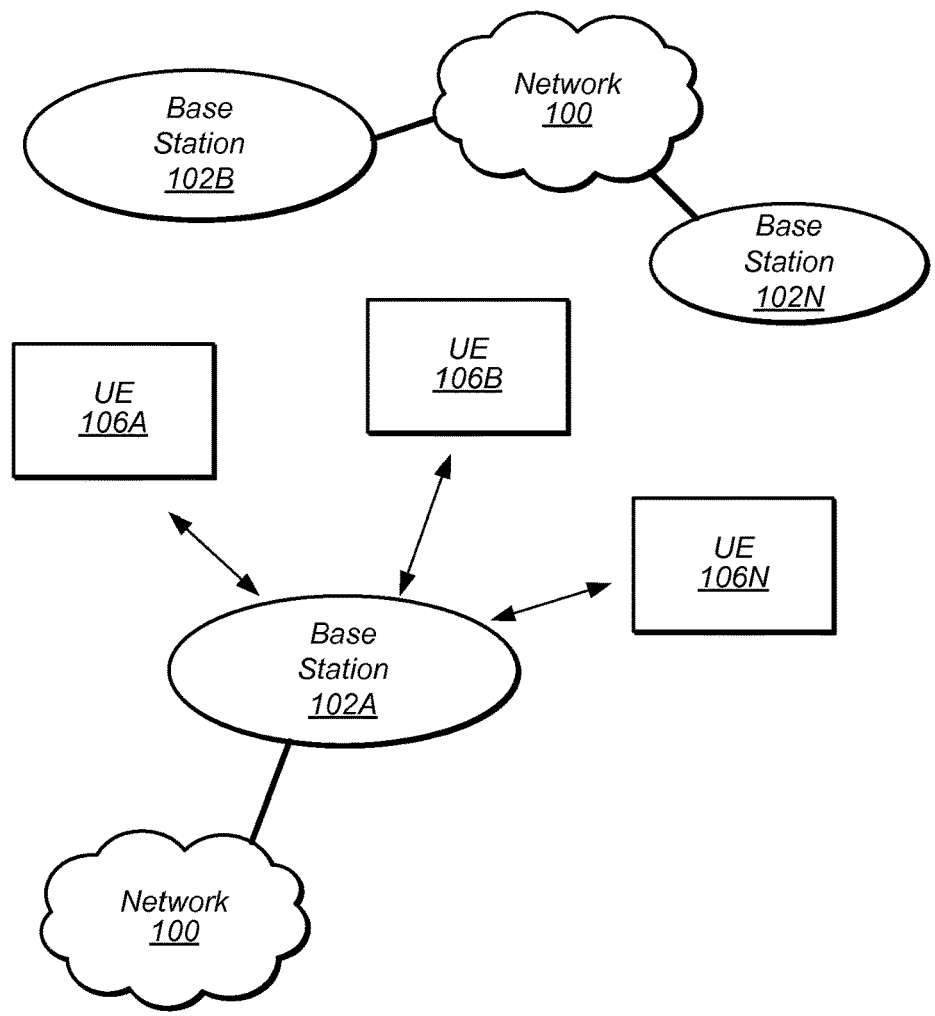
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EPC: Evolved Packet Core
EPS: Evolved Packet Service
MME: Mobility Management Entity
HSS: Home Subscriber Server
AS: Access Stratum
NAS: Non-Access Stratum
RLC: Radio Link Control
RRC: Radio Resource Control
MAC: Media Access Control
IE: Information Element
NW: Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect.

Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
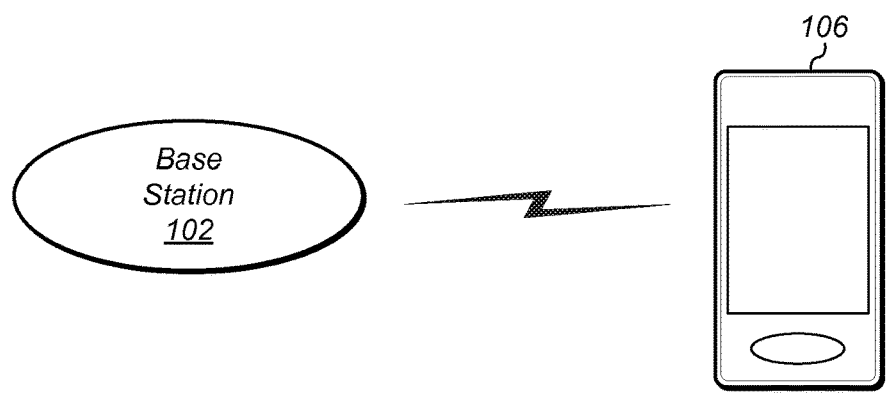
FIG. 2 illustrates a base station (BS) in communication with a user equipment (UE) device, according to some embodiments.
Figure 3:
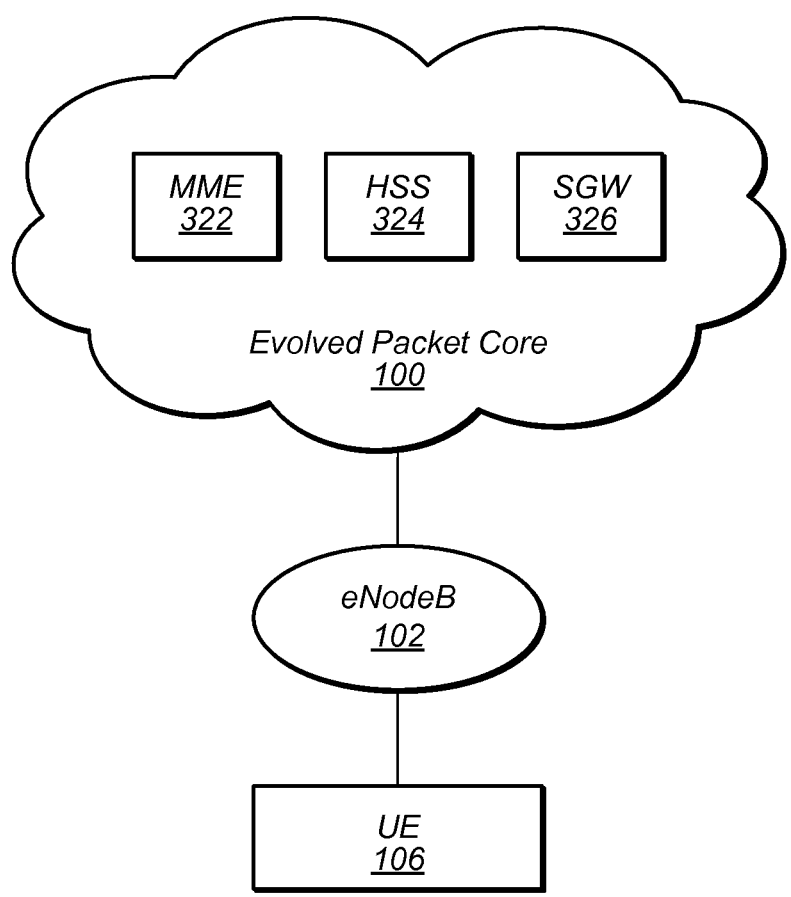
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
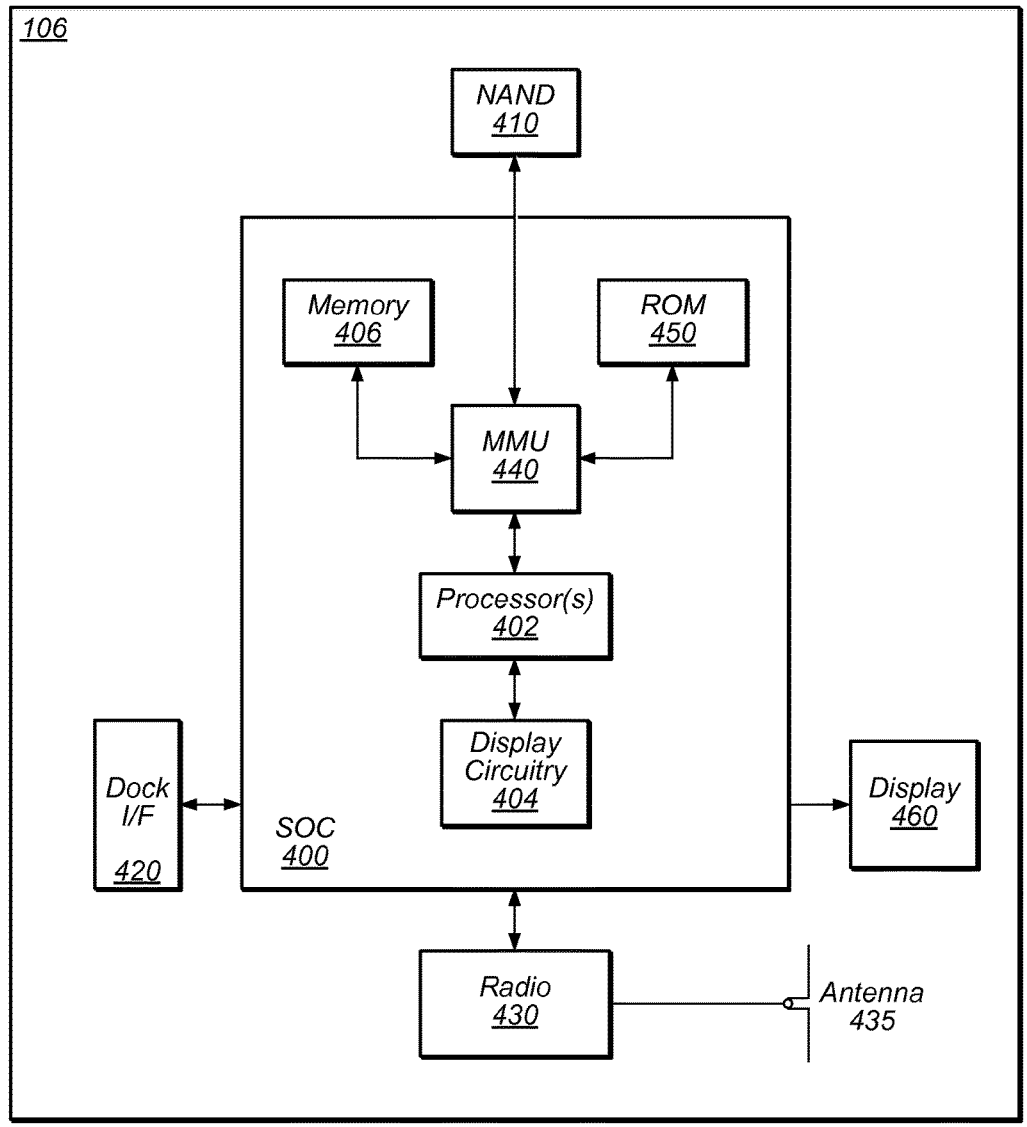
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
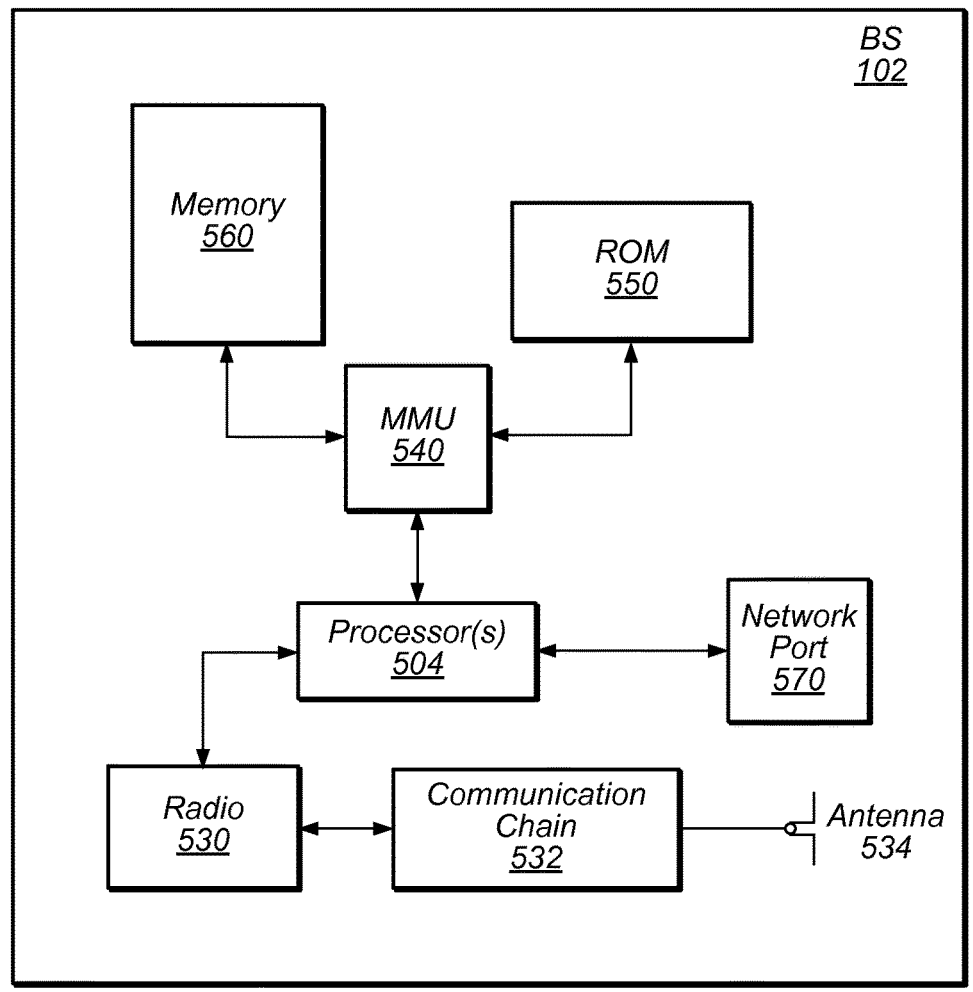
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
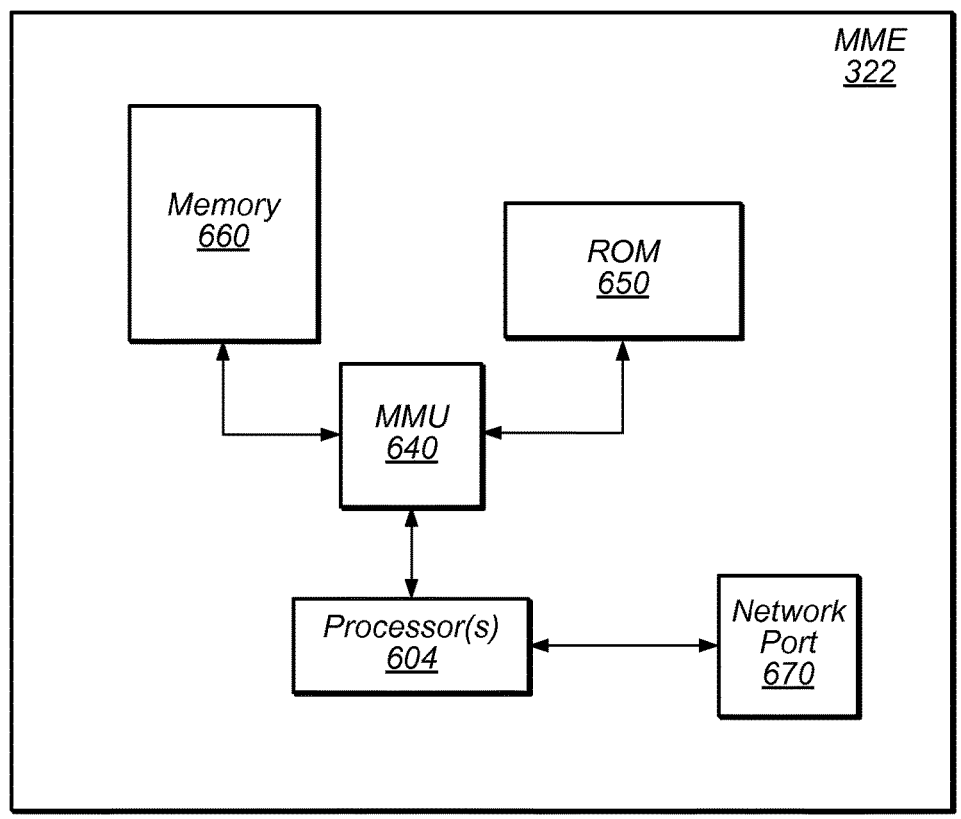
FIG. 6 illustrates an exemplary block diagram of an MME, according to some embodiments.

FIG. 6—Mobility Management Entity

FIG. 6 illustrates an exemplary block diagram of a mobility management entity (MME) 322, according to some embodiments. It is noted that the MME 322 of FIG. 6 is merely one example of a possible MME 322. As shown, the MME 322 may include processor(s) 604 which may execute program instructions for the MME 322. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The MME 322 may include at least one network port 670. The network port 670 may be configured to couple to one or more base stations and/or other cellular core network entities and/or devices.

The MME 322 may provide mobility related services to a plurality of devices, such as UE devices 106. For example, the MME 322 may be responsible for registering UE devices which attempt to perform an attach procedure, a tracking area update procedure, and/or any of various other procedures.

The MME 322 may communicate with base stations (e.g., eNBs) and/or other core network entities/devices by means of any of various communication protocols and/or interfaces. As one example, in a 3GPP context, the MME 322 may use any of an S1-MME, S3, S10, S11, S6a, and/or any of various other communication protocols or interfaces to communicate with other cellular network components.

The processor(s) 604 of the MME 322 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

In LTE, a UE may be able to operate in one of the two modes, an idle mode and a connected mode. In the idle mode, Discontinuous Reception (DRX) allows the UE to switch off its radio receiver and thereby reduce its power consumption. At least in some embodiments, it may be the case that a UE enters the idle mode upon receiving a Radio Resource Control (RRC) connection release message from the network. In the connected mode a UE can be in active data transmission or in a connected DRX mode. The connected mode DRX pattern may, for example, be used by the UE if configured by the network, and may follow a defined pattern of on and off cycles. DRX can be configured using any of a variety of settings, and at least in some instances multiple DRX modes (e.g., a short DRX or a long DRX) may be configured as desired.

In at least some cellular communication systems (for example, LTE Release 11 systems) there may exist a mechanism by use of which the UE may be able to communicate to the network whether the UE prefers a 'power optimized' configuration or a 'normal' configuration. This indicator may be referred to as a Power Performance Indication (PPI), at least in some instances. When UE sends an indication to the network (NW) setting its preference for the power optimized configuration, the NW may optimize the connected mode configuration, such as DRX configuration, and/or move the UE to idle mode, among various possibilities. At least in some instances, the details on when and how to set this indication may be specified according to UE implementation. Similarly, the NW response to such an indication may also depend on network implementation. At least some of the below described embodiments of the disclosure relate to possible uses for such a PPI in wireless communication systems.

Figure 7:
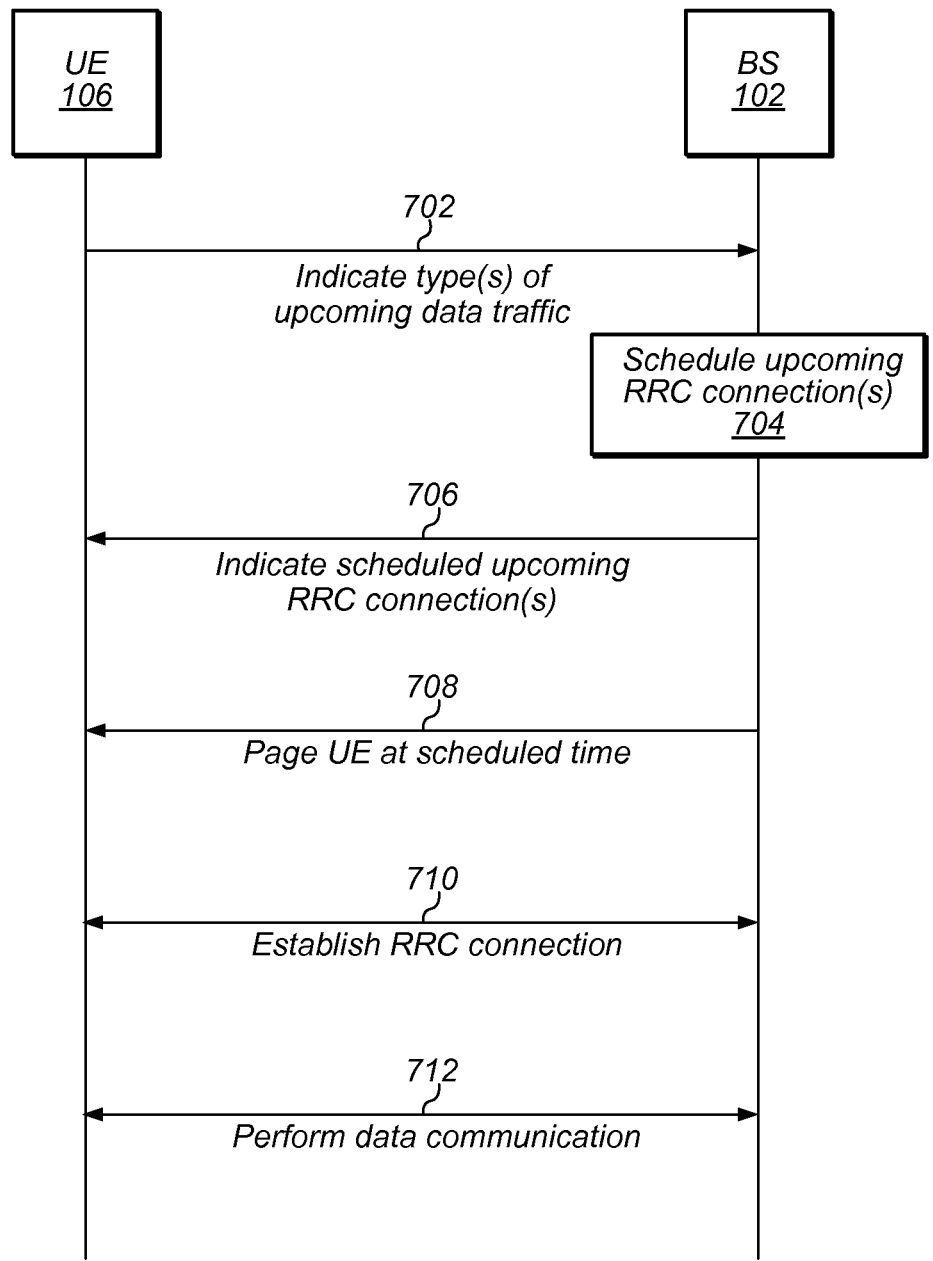
FIG. 7 is a communication flow diagram illustrating an exemplary method for establishing deterministic RRC connections based on data traffic characteristics, according to some embodiments.

FIG. 7—Communication Flow Diagram

FIG. 7 is a communication/signal flow diagram illustrating a scheme for deterministically setting up RRC connections between wireless devices and base stations in a manner that accounts for data traffic characteristics, according to some embodiments. The scheme shown in FIG. 7 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 702, a UE 106 may transmit an indication of one or more types of expected upcoming data traffic (e.g., uplink traffic, and/or downlink traffic) to a (e.g., serving) base station 102 or MME/(S/P)GW. The UE 106 may monitor application data already generated, buffered, and ready for transmission to determine the expected upcoming data traffic, according to some embodiments. Additionally or alternatively, the UE 106 may monitor application data generation and/or application data flow patterns to predict if one or more types of data traffic will be generated and ready for transmission within a certain time period. Other techniques for determining if one or more types of data traffic are expected by the UE 106 are also possible.

The indication may explicitly include information regarding characteristics of the upcoming data traffic. For example, certain characteristics such as expected bandwidth, priority level, delay budget/tolerance, application or application type, etc. may be indicated for each kind of upcoming data traffic included in the indication. One or more link characteristics (e.g., appropriate characteristics of a radio resource control (RRC) connection to be used to communicate the upcoming data traffic), such as scheduling request or channel state information frequency/periodicity, idle mode discontinuous reception (I-DRX) or connected mode DRX (C-DRX) configuration preferences, RRC inactivity timer preferences, etc., may also or alternatively be indicated.

Alternatively, or in addition, the indication may implicitly include information regarding some or all such characteristics of the upcoming data traffic. For example, different 'classes' of data traffic (e.g., similar or different to typical 'Quality of Service' or 'QoS' data classes) may be defined as each having a set of some or all of such characteristics and/or any of various other characteristics. For example, a table defining 'RAN QoS' or 'RQoS' (or 'Application QoS' or 'AQoS' if preferred) classes and parameters may be used, such as the following table:

| P1 P2 . . . PN |
|---|
| C1 |
| C2 |
| . . . |
| CN |

In this exemplary table, C1-CN may represent classes of data traffic or application classes, while P1-PN may represent parameters for which values may be specified for each class in the table to define the characteristics of that class. Thus, if such a table were in use, the indication might specify the RQoS class(es) of the upcoming data traffic, and thus implicitly include information regarding some or all characteristics or configuration preferences rather than explicitly providing such information in the indication.

Note that, at least in some instances, the UE 106 may dynamically determine the class, priority, or other characteristics of different types of data traffic (e.g., corresponding to different types of application data) based at least in part on monitoring application traffic patterns of user data of the UE 106. For example, the UE 106, may be able to analyze user patterns to determine which applications are and are not priorities for a given user. Based on such a determination, application data corresponding to a particular application might be assigned to different classes at different UEs, e.g., depending on the user traffic patterns of those different UEs. Likewise, user data patterns may change over time, and so determination by a UE 106 of which class, priority, etc. application data of a particular application belongs to may be different at different times, at least in some embodiments.

Note additionally that, if desired, the indication may identify multiple types of upcoming traffic (e.g., if multiple applications are active at the UE 106), at least in some instances.

The BS 102 may receive the indication from the UE 106 and may possibly also receive indications of upcoming data traffic types from multiple other UEs. In 704, the BS 102 may schedule upcoming RRC connections for the UE 106 (and possibly any other UEs served by the BS 102). Scheduling the upcoming RRC connections may take into consideration the characteristics (e.g., expected bandwidth and delay budget, etc.) of the upcoming data traffic for each UE served by the BS 102, while also taking into consideration the current and/or upcoming expected loading of the BS 102, and the current schedule of the BS 102. The upcoming RRC connections may be scheduled based on such considerations in such a manner as to attempt to optimize one or more network characteristics. For example, as one possibility, the BS 102 may attempt to schedule the upcoming RRC connections in such a manner as to smooth the loading of the BS 102 over time, which may improve network performance, while also attempting to meet the delay requirements of the data traffic of each of the UEs. The upcoming RRC connection scheduling may additionally or alternatively consider any of various other attempted optimizations and/or constraints.

In 706, the BS 102 may transmit an indication of scheduled upcoming RRC connection(s) to the UE 106. Note that the BS 102 may possibly also transmit indications of scheduled upcoming RRC connections to any other UEs for which upcoming RRC connections were scheduled. Each indication may inform a UE of timing of one or more upcoming RRC connections, and possibly also the type(s) (e.g., class (es)) of traffic to be communicated at that time. Note that the indication of timing of a scheduled RRC connection may be according to a system time (e.g., may specify a radio frame/subframe number or range of the scheduled RRC connection) of a wireless communication system in which the BS 102 and the UE 106 are communicating, as one possibility, or may use any of various other possible timing paradigms.

In some instances, the BS 102 may further indicate one or more characteristics of a scheduled upcoming RRC connection to a UE 106. For example, any or all of scheduling request frequency/periodicity, channel state information reporting frequency/periodicity, semi-persistent scheduling configuration, power settings (such as IDRX/CDRX configurations, fast dormancy options, RRC inactivity timer options, etc.), etc., for a scheduled upcoming RRC connection may be indicated to a UE 106 in addition to timing information for the scheduled upcoming RRC connection, if desired. Alternatively, certain RRC connection characteristics may be associated (e.g., by mutual exchange between the UE 106 and the BS 102 or other network elements, or in a statically/predetermined manner such as according to specification documents) with certain data traffic types or classes, such that indication of a type of data traffic associated with a particular scheduled upcoming RRC connection may implicitly indicate some or all of the characteristics of that scheduled upcoming RRC connection.

In some instances, the UE 106 may set a (e.g., baseband) sleep schedule based on receiving such an indication. For example, the baseband operations of the UE 106 may enter (or remain in) a low power (sleep) state (with possible interruptions for on-duration activities such as cell measurements and/or monitoring a paging channel) until the time at which the RRC connection is scheduled.

At the scheduled time, the UE 106 may wake up and 'listen' (e.g., monitor a paging channel) for pages from the BS 102. In 708, the BS 102 may page the UE (e.g., provide a paging message on the paging channel).

In 710, the UE 106 and the BS 102 may establish an RRC connection. This may be performed at the scheduled time and based on the UE 106 receiving the paging message from the BS 102. For example, the UE 106 may respond to the paging message and exchange RRC connection establishment parameters with the BS 102 to establish the scheduled RRC connection. In other words, at least in some embodiments, the scheduled RRC connection may be established in a network initiated manner, e.g., as opposed to requiring the UE 106 to perform a random access request (RACH) procedure in order to establish the RRC connection and enter a RRC_connected mode. Alternatively, the scheduled RRC connection may be established in a UE initiated manner if desired. Note that if any characteristics of the scheduled RRC connection were pre-arranged (e.g., if the BS 102 explicitly or implicitly indicated certain RRC connection characteristics when scheduling the RRC connection), the RRC connection may be established in accordance with those pre-arranged characteristics, at least in some embodiments.

In 712, the UE 106 and the BS 102 may perform data communication over the established RRC connection. This may include the UE 106 transmitting (uplink) data of a type which was originally indicated in the indication provided in step 702 and which was specified by the BS 102 for this particular RRC connection in the indication provided in step 706. At least in some instances, the UE 106 may also receive (downlink) data from the BS 102 via the RRC connection, for example in response to or in association with the uplink data provided by the UE 106. Note that, at least in some instances, the UE 106 may choose to transmit data of the class specified in the indication, and/or may send data belonging to another class, if desired.

Note that the techniques for deterministically scheduling RRC connections between a UE 106 and a BS 102 described herein above with respect to FIG. 7 may also be used in parallel with dynamic RRC connection scheduling techniques, if desired. For example, it may still be possible for a UE 106 to dynamically initiate an RRC connection with a BS 102 (e.g., in addition to deterministically scheduling other RRC connections with the BS 102 in advance), such as if the UE 106 generates high priority data that would require immediate transmission in order to meet the delay budget of the data.

Note additionally that while the method of FIG. 7 is described above as being performed between a UE 106 and a BS 102, at least in some instances it may be possible for a MME, SGW, PGW, or other network element to perform some or all of the method elements described as being performed by the BS 102. For example, indications of upcoming data traffic or one or more user devices may be provided to an MME or S/P-GW, which may perform scheduling of upcoming RRC connections, and may then provide indications of such scheduled RRC connections back to the user devices (e.g., by way of a base station). Note that at least in some instances, the establishment of those scheduled RRC connections may still be performed between user devices and their serving base station(s), in such a case.

Figure 8:
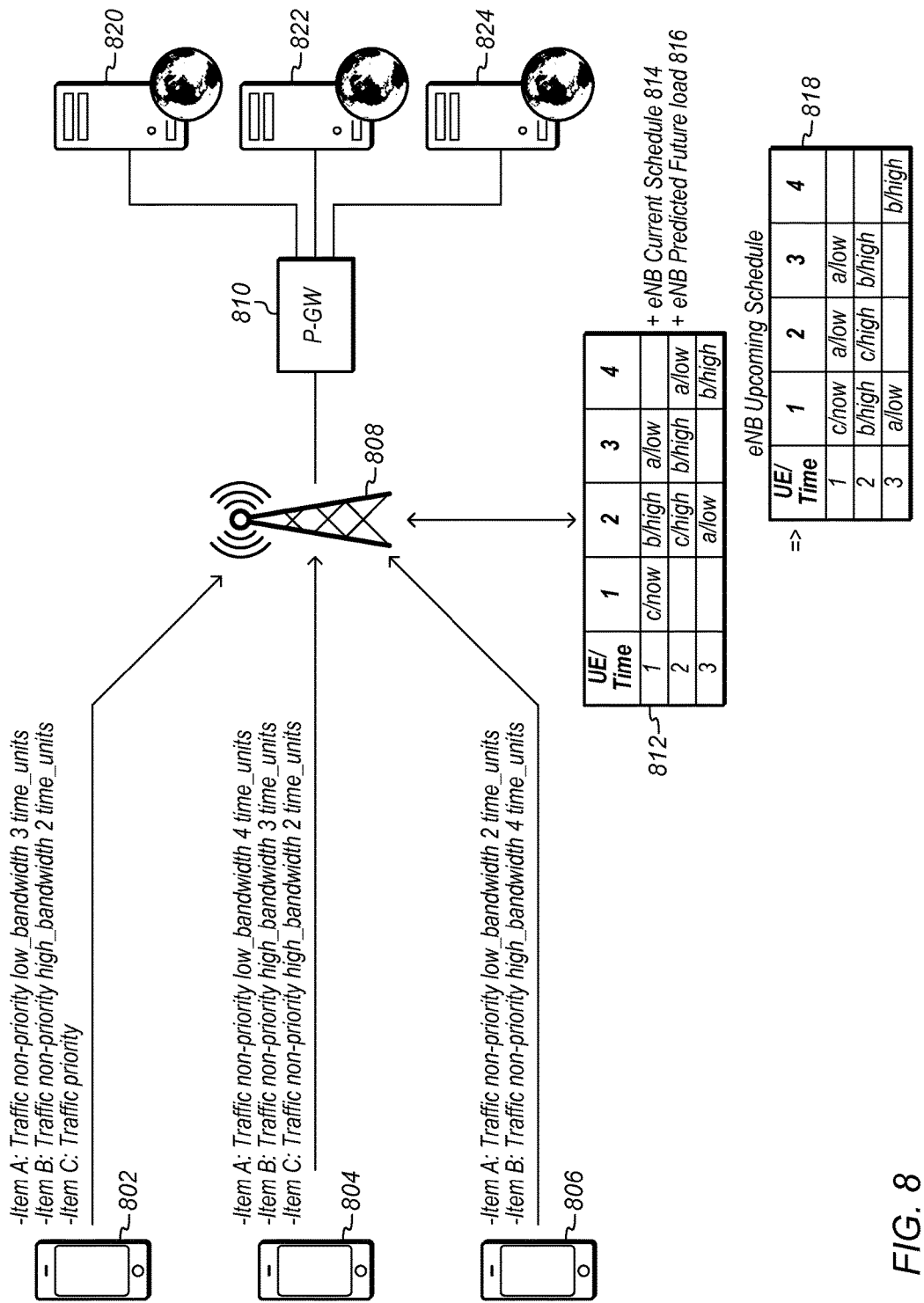
FIG. 8 is an end-to-end (E2E) diagram illustrating aspects of the method of FIG. 7, according to some embodiments.

FIG. 8—Exemplary End-to-End (E2E) Diagram

FIG. 8 and the description provided herein below in conjunction therewith are provided as being illustrative of further considerations and possible implementation details of the method of FIG. 7, and are not intended to be limiting to the disclosure as a whole. Numerous variations and alternatives to the details provided herein below are possible and should be considered within the scope of the disclosure.

In LTE and for cellular communication in general, for at least some background traffic and low priority/non-time critical traffic scenarios where the user has a large delivery time boundary requirements, solutions to reduce battery consumption and limit signaling overhead on the network may be desirable.

On the UE side, solutions to intelligently "bundle" traffic and reduce the overhead of control plane communication may be implemented. However, even with UE centric solutions to bundle data, lack of synchronization with other UEs within the same transmission/reception zones can cause DNS/RRC signaling floods, which can cause severe degradation of performance on the base stations (e.g., eNBs).

As one possibility for addressing such considerations, a framework between UEs and network components to further reduce battery consumption and limit signaling overhead on the network may be used.

As part of such a framework, the UE may analyze and build a user pattern to determine which apps are a priority and which are not for the user. The UE may exchange this information with the network components. The pattern may be exchanged during any of its connected states and the device may be provided with opportunities to modify it (e.g., based on changing application usage needs) with minimal user impact. Capabilities for static information exchanges (e.g., for priority/time critical apps) and for dynamic information exchanges (e.g., depending on the traffic generated by the UE) may be provided.

As one possibility, multiple configuration options for different RRC connections may be exchanged, agreed upon and stored between the UE and the eNB. Then, during actual scheduling and exchange of data, the network may choose one of these stored configurations and inform the UE of the choice.

These configurations may be specific to the type of data transfer being made; the network may decide which is the best configuration for the UE based on the current data pattern. The configurations may include parameters (SR/CSI frequency/periodicity, SPS configuration, etc.) related to data type for which an RRC connection will be used, and/or power settings options such as idle DRX (I-DRX)/connected DRX (C-DRX) configurations, fast dormancy options and RRC inactivity timer options. Options such as priority, expected bandwidth, and expected delay sensitivity may also be exchanged.

In order for this exchange of information, at least one of an RRC message, NAS message, or MAC control element may be used, at least according to some embodiments. The protocol exchange and the classes of configuration(s) may be mutually agreed between the network and the UE. Additionally, the network may be able to understand changing UE radio requirements using information available through UE Reporting mechanisms and changing Apps priorities and traffic types.

The eNB may also make decisions regarding the RRC state of a UE depending on the window (e.g., the amount of time to schedule certain data as agreed with the NW) for Application data scheduling (which may, for example, be contrasted with approaches focusing on inter-arrival times). For example, the eNB may decide if the UE needs to stay in RRC connected state with a longer C-DRX cycle with a high value of RRC inactivity timer, or in RRC idle mode with a short RRC inactivity timer; may determine values for the C-DRX inactivity timer; and/or may determine C-DRX/I-DRX parameters in such a manner, among various possibilities.

As an example, a UE might provide some or all of the following information to an eNB:

Class A: Traffic non-priority low_bandwidth 3 time_units long_cdrx_cfg_1 long_inactivity_cfg_2 traffic_type_x delay_tolerance_cfg_1

Class B: Traffic non-priority high_bandwidth 2 time_units no_cdrx network_rrc_tear_cfg_4 traffic_type_y delay_tolerance_cfg_2

Class C: Traffic priority short_cdrx_cfg_2 short_inactivity_cfg_1 traffic_type_z delay_tolerance_cfg_3

Such information may thus indicate that the UE has three different types of expected upcoming data traffic, and may indicate various characteristics/preferences (such as expected bandwidth, length, requested DRX configuration settings, delay tolerance configuration, etc.) with respect to each type. Note that, at least in some instances, it may not be required to explicitly specify the characteristics/preferences, for example if RQoS classes are agreed between the network and UE; in such a case, the UE may inform the network of the RQoS class(es) which it requires, which may implicitly provide additional information regarding the data traffic characteristics and/or requested RRC connection parameters.

Note also that upon generation of traffic by the UE which has not already been indicated (and, for example, which has some priority), it may also be possible for the UE to provide a 'dynamic' or supplemental indication, for example adding a 'Class D'.

FIG. 8 illustrates an end-to-end diagram illustrating a method for scheduling RRC connections in an exemplary LTE scenario, according to some embodiments.

As shown, each of multiple UEs 802, 804, 806 may provide an indication to their serving eNB 808 of their expected upcoming data traffic and it's characteristics/Classes. The eNB 808 may consider such preliminary information 812, as well as the eNB current schedule 814 and eNB predicted future load 816 (which may be at least partially informed by communication with the P-GW 810, which may provide a link with one or more servers 820, 822, 824 to and from which data communications may be performed), to generate a schedule of upcoming RRC connections 818. Thus, once the time at which a UE has to be scheduled occurs, the eNB 808 can guarantee an RRC connection for the particular UE.

Note that as an alternate possibility, information regarding data traffic type may be provided by UEs to a mobility management entity (MME) and or (S/P)-GW, which may perform RRC connection scheduling for the UEs.

The eNB may also transfer scheduling information back to the UE. For example, the network may inform the UE of a sleep wake-up schedule for the UE and the particular type of traffic that the UE can do at that time, thus guaranteeing a RRC connection. The UE will receive a page, then establish an RRC connection (e.g., according to the specified RRC connection parameters), and get/send the data traffic. This may, at least in some instances, result in the UE obtaining an optimized connection (e.g., in terms of delay and bandwidth).

Note further that, at least in some instances, this may eliminate the need for the UE to send push type of notifications to the server, and may also/alternatively avoid the time related pings which may be a consequence of NAT timer settings on some networks.

As an alternate solution, it may also be possible for the P-GW to gather all the information related to the UE clients, gather the information from the respective end-nodes (e.g., servers) and send it back to the UE as a terminating connection. As one example, such a solution may be useful for VoIP type of clients where there is very little user information exchanged per keep-alive. However, for accounts for which security is particularly important, the UE based mechanism may be preferable, at least in some instances.

Figure 9:
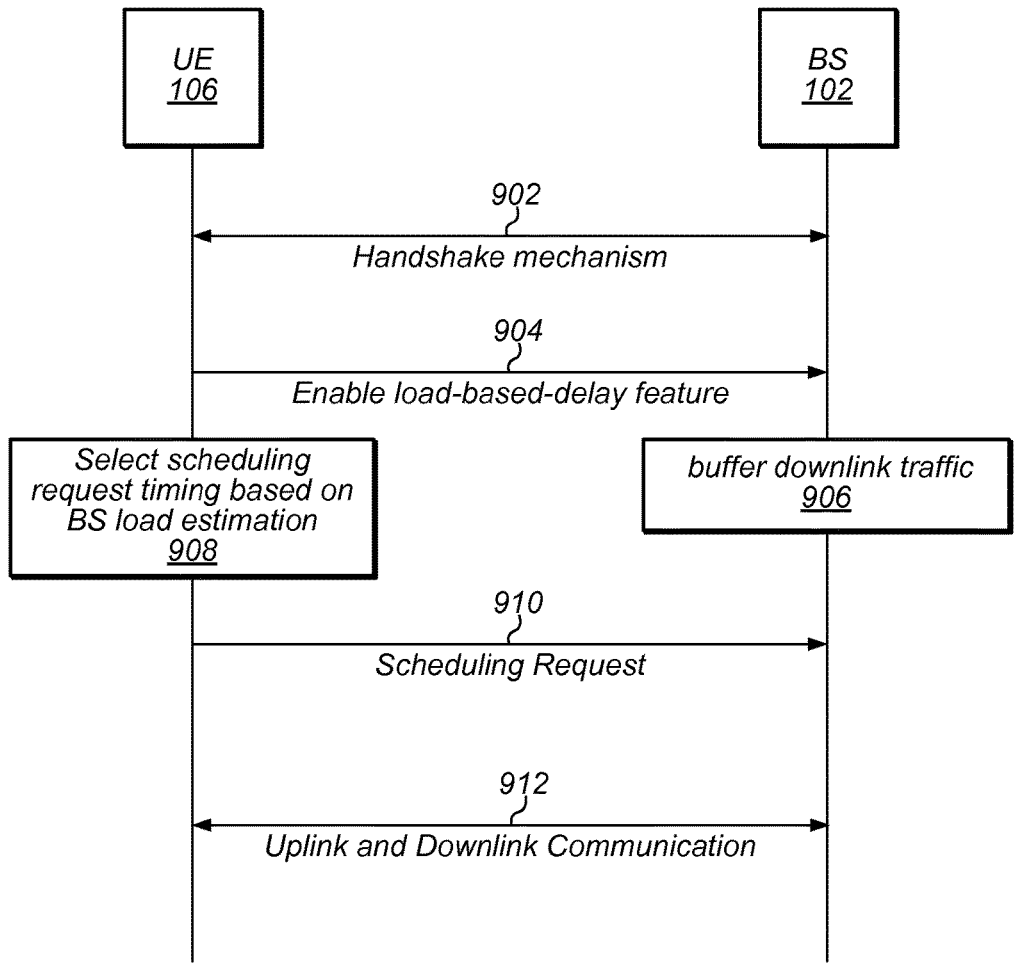
FIG. 9 is a communication flow diagram illustrating an exemplary method for implementing a load-based-delay feature, according to some embodiments.

FIG. 9—Communication Flow Diagram

FIG. 9 is a communication/signal flow diagram illustrating a scheme for a load-based-delay feature between wireless devices and base stations, which may reduce device power consumption, according to some embodiments. The scheme shown in FIG. 9 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 902, a UE 106 and a BS 102 may exchange information in a handshake mechanism to determine whether or not both entities support a load-based-delay feature. Thus, the handshake mechanism may establish that both the UE 106 and the BS 102 support the load-based-delay feature (i.e., in the case that both do support the feature).

As one possibility, the handshake mechanism may include an exchange of information during radio resource control (RRC) connection establishment. For example, UE support of such a feature may be indicated in a UE capabilities information element (IE), while BS support of such a feature may be indicated in an RRC connection reconfiguration message which may follow the exchange of UE capability information. Other mechanisms are also possible.

In 904, the UE 106 may provide an indication to the BS 102 to enable the load-based-delay feature. As one possibility, the indication may be a power preference indicator (PPI) having a value indicating a preference for a lower power usage configuration (e.g., '1'), which may be provided by the UE as part of a UE Assistance Information IE. As another possibility, the indication may be a MAC control element having a value indicating a request to enable the load-based-delay feature.

The indication may be provided at any of various times, and based on any of various considerations. As one possibility, the indication may be provided at a time at which low downlink and/or uplink activity is detected, and the existing traffic is relatively delay insensitive (e.g., having a delay sensitivity below a delay sensitivity threshold, such that no or minimal adverse effect will be caused by introducing a degree of delay expected to be introduced by the load-based-delay feature). For example, 'background' and/or 'best effort' type traffic may have delay sensitivity characteristics such that the load-based-delay feature may be appropriate, at least in some instances.

Based on enabling the load-based-delay feature, in 906 the BS 102 may begin buffering any downlink traffic intended for the UE 106 until an uplink scheduling request is received by the BS 102 from the UE 106, e.g., in order to align the downlink traffic with uplink traffic from the UE and reduce the UE awake time. Such buffering may also be subject to overall buffer size and fullness at the BS 102, and/or a timer (e.g., in order to avoid excessive delays). For example, in some instances, if buffer fullness above a certain threshold is detected by the BS 102 before an uplink scheduling request is received, the BS 102 may provide a downlink grant and transmit the downlink traffic to the UE 106 even if the load-based-delay feature is enabled. As another example, in some instances, if a data buffering timer expires before an uplink scheduling request is received, the BS 102 may provide a downlink grant and transmit the downlink traffic to the UE 106 even if the load-based-delay feature is enabled.

Additionally, based on enabling the load-based-delay feature, in 908 the UE 106 may select uplink scheduling request timing based at least in part on estimated load of the BS 102. For example, the UE 106 may attempt to select a time at which to transmit an uplink scheduling request when the BS 102 is relatively unloaded. This may help smooth network load and reduce the amount of time for which the UE 106 may remain awake waiting for an uplink grant in response to the scheduling request, which may also reduce power consumption by the UE 106.

Note that the uplink request scheduling timing by the UE 106 may also be subject to buffer fullness threshold and/or data buffering timer constraints, in some instances.

In 910, the UE 106 may provide (transmit) an uplink scheduling request to the BS 102, e.g., according to the selected timing. For example, according to the load-based-delay feature, the UE may buffer uplink application data traffic until one of estimated loading of the BS is below the loading threshold; a buffer fullness threshold is exceeded; or a data buffering timer expires, and provide the uplink scheduling request upon detecting one of those conditions.

In 912, the UE 106 and the BS 102 may perform uplink and downlink communication. The communication may be partially or entirely temporally overlapping. For example, based on the uplink scheduling request, the BS 102 may provide an uplink grant, and may also at or around the same time provide a downlink grant. The UE 106 may then transmit uplink data during the uplink grant, and the BS 102 may transmit downlink data (which may have been buffered, such as described with respect to step 906) during the downlink grant.

Note additionally that at least in some instances, a further mechanism may be used to reduce power consumption in conjunction with the above-described method by delaying scheduling request responses. For example, if desired, it may also be agreed between the UE 106 and the network providing the BS 102 that when a power preference indicator is enabled (or by default as part of the load-based-delay feature, if desired), a 'delayed scheduling request response' feature may also be enabled. In this case, after sending an uplink scheduling request, the UE 106 may enter (return to) a sleep mode as part of its C-DRX cycle until its next scheduled on-duration. The BS 102 may thus wait (at least) until this next scheduled on-duration of the UE 106 to provide an uplink grant in response to the scheduling request. This may reduce power consumption by the UE 106 relative to an implementation in which the UE 106 continuously monitors for a grant upon sending a scheduling request.

Figure 10:
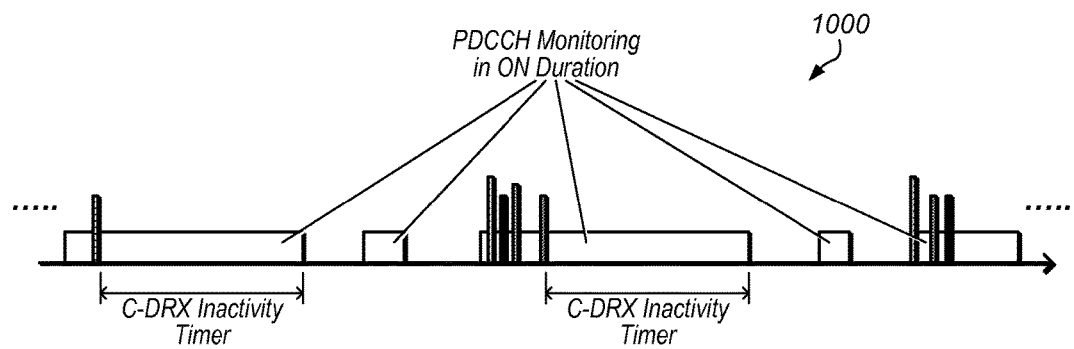
FIGS. 10-11 illustrate exemplary details relating to the method of FIG. 9, according to some embodiments.
Figure 11:
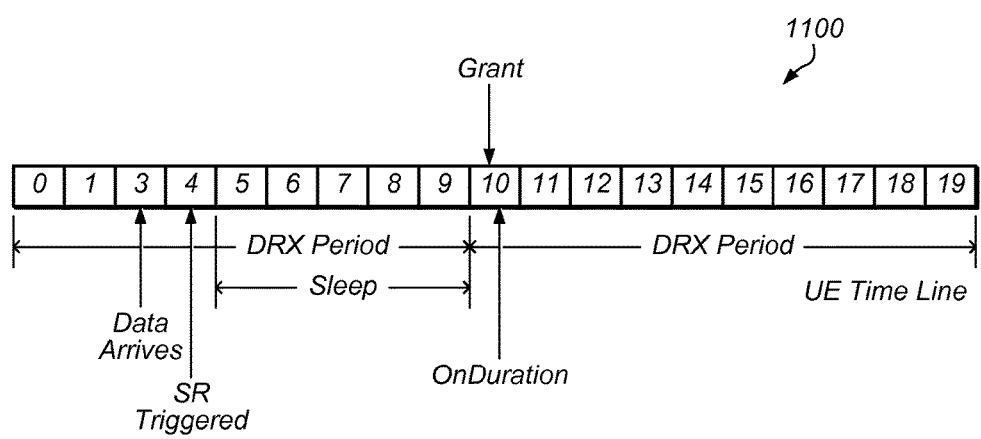

FIGS. 10-11—Exemplary Details Relating to FIG. 9

FIGS. 10-11 and the description provided herein below in conjunction therewith are provided as being illustrative of further considerations and possible implementation details of the method of FIG. 9, and are not intended to be limiting to the disclosure as a whole. Numerous variations and alternatives to the details provided herein below are possible and should be considered within the scope of the disclosure.

In 3GPP Release 11, a Power Preference Indicator is introduced to allow a mobile device to inform the network (NW) of the mobile device's power saving preference. At least according to 3GPP Rel. 11, it is not specified how eNBs are to use this 1-bit information. The UE preference in terms of battery saving may depend on the UE activity (e.g., type(s) of applications that are active), which information may not be available at the eNB. Hence a mechanism to share information between eNBs and UEs and to coordinate operation to enable power saving benefits at UEs may be desirable.

As one possibility a UE might be running one or more Applications that utilize and/or require background traffic, such as email applications. This traffic may be infrequent and/or not time critical (for example, a daemon may be used to detect the background traffic). In case the cell (e.g., eNB in LTE) is loaded, the UE might not get a grant for such traffic in a timely manner. This might prolong the UE awake period, which may in turn impact the battery consumption.

It may be possible for a UE to estimate eNB cell utilization during RRC Connected and Idle mode. The UE could use such information to schedule its background data traffic. For example, the UE may buffer its data until load condition (and channel conditions) improve and/or indicate to the eNB that the downlink transfer can happen at a future time. The UE and the eNB may establish a hand-shake mechanism to ensure compatible behavior in this regard.

For example, in the case a UE is running a non-priority best effort application (e.g., non time critical/background traffic), the UE may ask for a grant only if the load conditions are favorable (e.g., below a certain threshold).

The eNB, based on the hand-shaking mechanism, may know the type of UE traffic. Accordingly, it may also buffer the DL traffic and make sure to align with the UL traffic in order to reduce the awake time. For example, the eNB may wait for a scheduling request (SR) from a UE in such a scenario before communicating the DL traffic.

Note that the buffering at the eNB may be enabled/disabled at various times further based on data buffer size and/or fullness. For example, if the number of the bits in all queues is less than a threshold, then the eNB may delay the traffic until load conditions improve and/or to align UL/DL traffic, but may not if the number of the bits in all queues is greater than the threshold. Other algorithms for determining when to enable or disable such buffering are also possible. Note also that such buffering may be performed between the NW and the UE only for RRC connected mode, at least in some instances.

The hand-shake mechanism itself may utilize RRC signaling to enable the UE and the eNB to detect that they support such feature. As previously noted, such a mechanism could be agreed upon between the UE and the eNB.

As one possibility, an RRC message that is sent once when the UE establishes an RRC connection to the NW to indicate that it supports the "delay until better load" feature may be used. The UE Capability Information message could be one such RRC message to use to indicate to NW that the UE supports the feature. Such information may be provided in any of various information elements within this message. As an example, a new information element within the UE-EUTRA-Capability container information element may be defined and used to indicate support for the "delay until better load" feature. As a still further example, a new value of an existing parameter in the feature group indicator (FGI) IE may be defined as indicating support for the "delay until better load" feature. Numerous other possibilities may alternatively be used if desired. Additionally, note that the UE can also include, in the modified RRC message, the information about the application traffic.

To complete the handshake mechanism, the network may acknowledge to the UE that it supports the "delay until better load" feature. As one possibility, the network may use a new information element in the RRC Connection Reconfiguration message that follows the exchange of UE capability information. Similarly, however, numerous other possibilities may alternatively be used if desired.

Once the UE is detecting a long period of low activity, with background traffic, the UE may send an indication, such as a reserved MAC control element (e.g., which may be agreed upon with the NW) or a "Power Pref Ind=low Power" indication, to the network requesting that the "delay until better load" feature be enabled. If desired, such an indication may also indicate to the eNB to buffer data for a particular type of application. Subsequently, upon detection of the indication, the eNB may buffer the traffic until reception of an SR from the UE. Note that if desired, the UE may additionally change to an extended DRX cycle in conjunction with sending the indication requesting the load-based-delay feature be enabled. The eNB may buffer the data, e.g., as long as the buffer sizes didn't exceed a predetermined threshold and/or if a timer (e.g., defined at the eNB) expires and the eNB has not received an SR yet (e.g., to avoid excessive buffering delays).

As previously noted, the UE may send the indication requesting enablement of the load-based-delay feature upon detecting a long period of low activity, at least in some instances. On the UL, the UE may know the nature (e.g., time critical or not) of the applications running and may have an estimate of its buffer status. Accordingly, the UE may know when the UE needs to send an SR (e.g., including taking into account the load estimation). In the DL, however, the UE may need to estimate the DL activity. FIG. 10 illustrates aspects of one possible technique for doing so, according to some embodiments.

In particular, a UE may monitor the number of DL assignments received in the physical downlink control channel (PDCCH), and determine a DL activity level based on its observations. For example, if the average number of DL assignments in a number of C-DRX cycles is less than a threshold, 'low DL activity' may be considered to have been observed, while 'high DL activity' may be considered to have been observed if the average number of DL assignments in the number of C-DRX cycles is greater than the threshold. Alternatively, 'low DL activity' may be considered to have been observed if n (threshold) or more out of the N (monitoring window) last PDCCH monitoring TTIs do not include a DL assignment, while 'high DL activity' may be considered to have been observed if less than n out of the N last PDCCH monitoring TTIs do not include a DL assignment. Thus n/N may be an activity ratio.

Thus, considering the illustrated scenario 1000, eight total DL assignments are received in the five C-DRX cycles (for an average number of DL assignments per C-DRX cycle of 1.6) and one or more DL assignments are received in three of the five C-DRX cycles, such that activity ratio is 2/5.

FIG. 11 illustrates an optional mechanism for additional potential power savings, in which eNB SR responses may be strategically delayed when low-power operation is desired. Currently, when a UE sends an SR, UE will break DRX and start monitoring in the DL continuously, at least according to some embodiments. Due to this the UE may be awake for a relatively long time (e.g., depending on the NW load). According to the mechanism illustrated in the exemplary arrangement 1100 illustrated in FIG. 11, however, the UE may instead go to sleep after sending the SR, and the NW may schedule the UE at the next OnDuration(s) according to UE's C-DRX cycle. Note that in some instances, if the UE is in a long DRX cycle before sending the SR, the UE may fall back to a short DRX cycle after sending the SR, e.g., to reduce the introduced SR response delay.

Additionally or alternatively, if desired, in case the SR opportunity aligns with the ON duration, if the UE does not receive an uplink grant after sending the SR before the following SR opportunity, and the following SR opportunity falls during the Off period, the UE may elect to not resend the SR during the SR opportunity falling during the Off period, but may instead elect to wait for the next ON duration to resend the SR.

FIGS. 12-16—AP/BB Synchronization and Additional UE Power Consumption Reduction Mechanisms FIGS. 12-16 and the following supplementary description are provided as being illustrative of further considerations and possible implementation details, and are not intended to be limiting to the disclosure as a whole. Numerous variations and alternatives to the details provided herein below are possible and should be considered within the scope of the disclosure.

In a communication network such as LTE, there may be at least two radio interface entities, NW and UE. Furthermore, in a UE there may generally be at least two entities, the application processor (AP) and baseband processor (BB).

At least in some current implementations, there may be no synchronization between a NW and a UE to determine the instances of data availability such that the NW is able to schedule opportunistically and/or for the UE to wake and listen opportunistically. Due to this lack of synchronization, UEs may generally be expected to wake up at every DRX cycle and stay on for the 'onDuration' time.

Furthermore, between the AP and BB entities in a UE there may be little synchronization regarding when to transmit (Tx) and receive (Rx) data and when to wake up. Due to this lack of such synchronization, the AP may wake up the BB to send data when there is no transmit opportunity, or when obtaining transmit opportunity is costly (e.g., in terms of power and resources). Additionally, the AP may wake up based on application specific timers and try to send/receive data, in a manner that is not synchronized to the BB and NW timings.

Accordingly, certain features for synchronizing all the entities in a communication network (e.g., NW, BB, and AP) for effective power savings are described herein.

When connected mode DRX is used, the communication between the NW and UE may be synchronized in the DL direction, as the NW may send only during the 'OnDuration', which repeats every DRX cycle. In the UL direction a UE may be able to initiate data transmission to the NW at any time using an SR or a RACH (e.g., depending on the criterion to initiate). However, sending a RACH or SR may be disadvantageous from a power consumption perspective, at least in some instances, as it may require a transmit operation and take more power, as the UE may be awake for an extended time when compared to being awake at 'OnDuration' and handling the data at that time.

Hence, it may be advantageous for all the communication between the UE and NW to be synchronized to the configured DRX. Such synchronization may include the AP waking up and sending data to BB in a manner that maps to the BB wakeup times and/or transmit/receive opportunities. Such synchronization may also include the AP providing timing information to the BB based on the applications currently running on the AP. In particular, indicating timing of the next expected data (potentially including either or both of an amount of time until uplink application data or downlink application data is next expected by the AP, among various possible ways of defining the next expected data) may allow the BB to sleep for a longer time period (e.g., skipping one or more DRX cycles or extending a DRX cycle).

Figure 12:
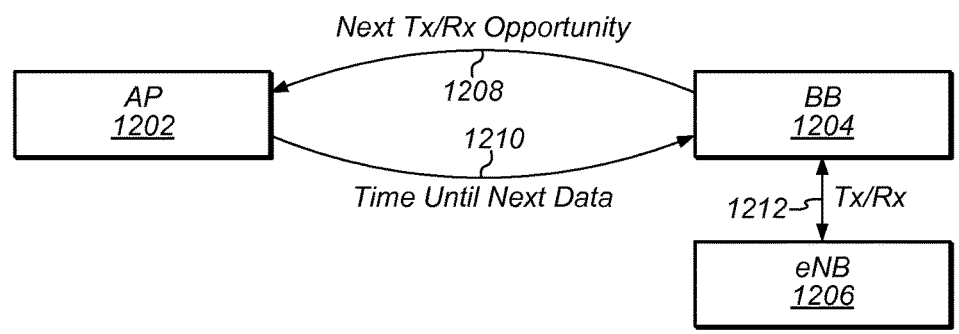
FIGS. 12-16 illustrate exemplary aspects of AP/BB synchronization and additional UE power consumption reduction mechanisms, according to some embodiments.

Hence, the BB and the AP may exchange timing information with each other to provide this synchronization. In particular, and as illustrated in FIG. 12, the BB 1204 may communicate the next available BB wake up and/or transmit/receive opportunity time 1208 to the AP 1202, and/or the AP 1202 may communicate the time until the next expected data 1210 to the BB 1204.

The BB 1204 may derive the next available wake up time based on the last data transmit/receive time and the next wake up, and/or transmit/receive opportunity time, e.g., based on NW configuration and scheduling. In connected mode this may be based on the connected DRX configuration, SRS periodicity, RACH opportunities, etc. In idle mode this may be based on the Idle DRX configuration and scheduling.

The AP 1202 may derive the time until the next expected data based on the buffers being accumulated in the AP 1202, as one possibility; for example, when running a streaming video application, there can be multiple DRX cycles where there will not be any data activity, e.g., if sufficient playback information is already buffered at the AP 1202. Alternatively or in addition, AP 1202 may derive the time until the next expected data based on the heartbeat of the application(s), which can be below the connection release timer.

When the AP 1202 communicates the next expected data, the BB 1204 may wake up according to the timing given by the AP 1202 (and matching to the UE's DRX configuration). Note that this may result in the BB 1204 skipping some DRX cycles (or extending the DRX cycle).

When (the BB 1204 of) the UE wants to extend the DRX cycle, the UE may communicate (e.g., to an eNB 1206 of the NW) the DRX cycle extension as a multiple of the current configured DRX configuration and a duration in which UE does not expect much data activity. The DRX cycle of the UE may accordingly be extended for the specified duration.

If instead the BB 1204 skips some DRX cycles (does not wake up during the OnDuration of those DRX cycles), and if the NW sends any data in the 'OnDuration' corresponding to those DRX cycles, the UE will miss that data. In order to avoid data loss when the BB 1204 skips a DRX cycle, the NW may need to retransmit the data in the subsequent DRX cycle 'OnDuration'. Since it may be possible for the BB 1204 to skip multiple DRX cycles, it may be desirable to set a maximum limit on the number of DRX cycles that can be skipped by the BB 1204, e.g., in order to limit the number of times NW needs to retransmit the same data. If the number of DRX cycles which could be skipped (e.g., based on the amount of time until the next expected data) is greater than this maximum limit, the BB 1204 may wakeup and listen in the next 'onDuration' after the maximum limit of skipped DRX cycles is reached. This concept may be similar to Idle mode paging, in which the NW may not give up if UE does not respond after the first page, but may instead try multiple times to page a UE before giving up.

Thus, said another way, the BB 1204 may skip some of the C-DRX cycle OnDurations, with a possible limit on the number of C-DRX cycle OnDurations to be skipped. Additionally, if desired, the BB 1204 may communicate to the AP 1202 (for synchronization) that it is skipping some (e.g., specific number of) DRX wakeups. This may make the average DRX cycle length effectively larger than the actual DRX configuration and may lead to greater power gains. At least in some instances, the potential performance issues which might be caused by the BB 1204 skipping the DRX cycles may be compensated for by NW retransmissions.

As a still further possibility, a UE may send an indication to the network of a duration of the number of DRX cycles to skip. As yet another possibility, the UE may send an indication to start and stop this process. This indication can be done using either a MAC Control Element (CE) or a RRC message, among various possibilities.

Figure 13:
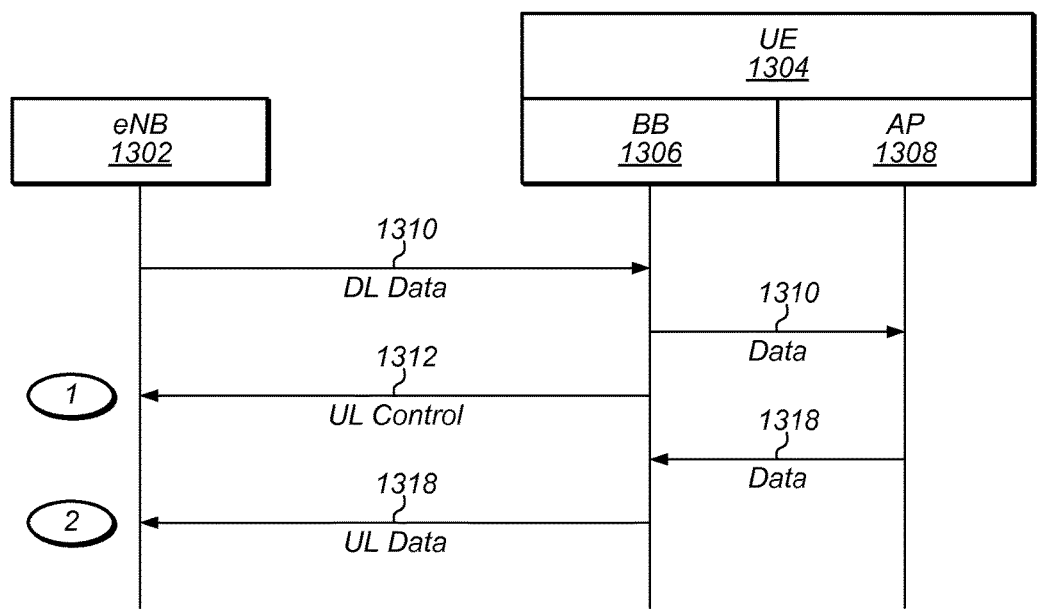

Inter Layer Optimization:

On certain occasions, data exchange between a UE and a NW may be intermittent. As illustrated in FIG. 13, on some such occasions, data 1310 may be received from the NW (by way of eNB 1302) for which the BB 1306 of the UE 1304 needs to send a lower layer control information type response 1312 (e.g., RLC ACK/NACK). At least in some instances, for the same data 1310 the AP 1308 of the UE 1304 may respond back with higher layer (e.g., application) data 1318 within a short timeframe. In this case, in the existing art, a UE 1304 may take at least two transmit opportunities to send such data to the eNB.

Figure 14:
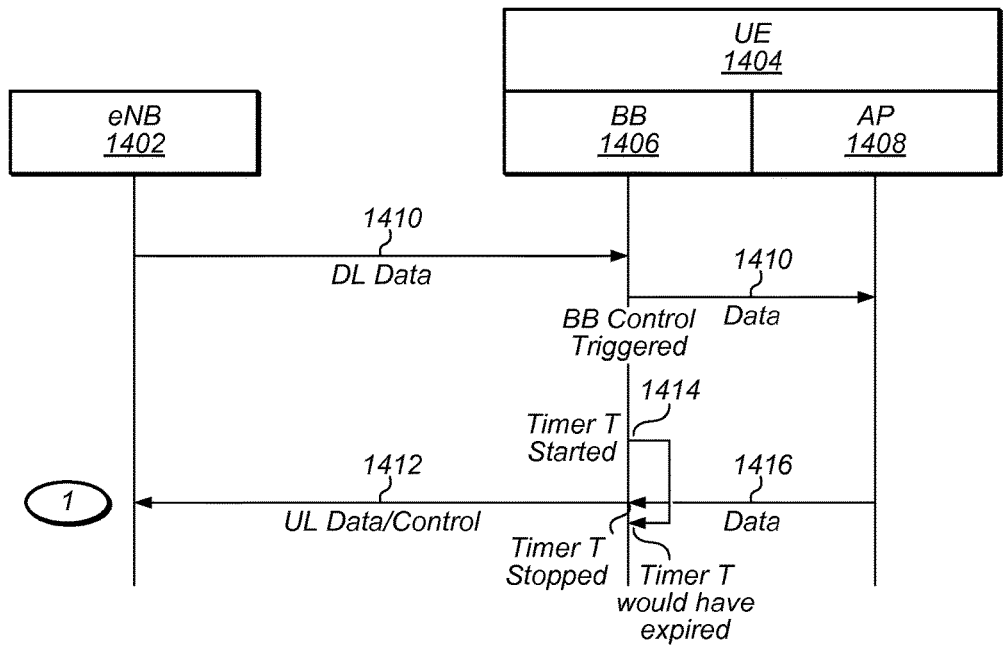

In such an occasion as just described, i.e., in a scenario when received data is intermittent, and only L2/L3 control PDUs are ready for TX, the transmitter can delay the transmission for a stipulated amount of time so that the L2/L3 control PDUs may be able to be grouped with higher layer data. This is illustrated in FIG. 14. As shown, downlink data 1410 may be received from an eNB 1402 at a BB layer 1406 of UE 1404. The BB 1406 may provide the data 1410 to the AP layer 1408 of the UE 1404, and may generate its control information response to the DL data 1410. In 1414, a timer T may be started; if the BB 1406 receives UL data 1416 from the AP 1408 prior to expiration of the timer T, the timer T may be stopped and an uplink data/control transmission 1412 may be performed from the BB 1406 to the eNB 1402.

Figure 15:
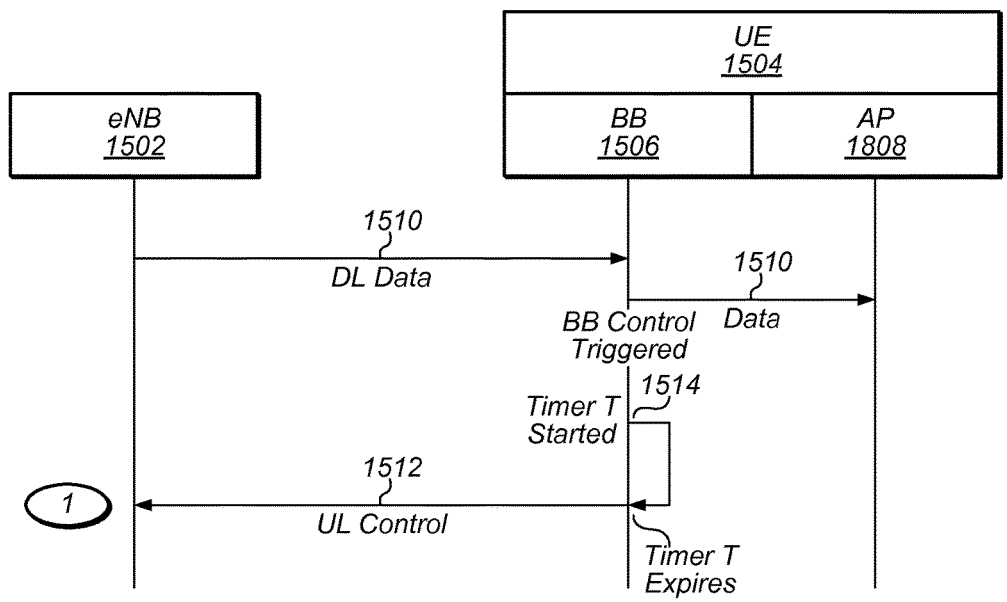

If there is no data received from higher layer for the stipulated time, control PDUs are transmitted. This is illustrated in FIG. 15. As shown, downlink data 1510 may be received from an eNB 1502 at a BB layer 1506 of UE 1504. The BB 1506 may provide the data 1510 to the AP layer 1508 of the UE 1504, and may generate its control information response to the DL data 1510. In 1514, a timer T may be started; if the BB 1506 does not receive UL data from the AP 1508 prior to expiration of the timer T, an uplink control transmission 1512 may be performed from the BB 1506 to the eNB 1502 upon expiration of the timer T.

Thus, if desired, L2/L3 control PDUs can be grouped for transmission with higher layer data when data transfer is intermittent. The stipulated time (e.g., timer value) used may be any of various times; as one possibility, a poll timer such as might already be in place to ensure an acceptable delay for L2 ACKs may be used.

Quick Transition to Long DRX:

According the current art, at least in some instances while a UE is in a DRX long or short cycle and when a data exchange occurs, the UE may continue to operate in the DRX short cycle before transitioning to a DRX long cycle for a stipulated amount of time according to a short cycle timer (e.g., the parameter 'drxShortCycleTimer'). When the PPI is set as 'lowPowerConsumption' and sent to NW (e.g., indicating that the UE prefers a low power configuration), in the current art a UE may still follow the short DRX for the stipulated number of subsequent DRX cycles before changing to the long DRX cycles.

As a possible modification, upon a UE providing an indication to the network (e.g., by way of a base station), for example by setting the PPI bit as 'lowPowerConsumption', the UE may be able to transition to a longer DRX cycle immediately (e.g., before expiration of the DRX short cycle timer), thus reducing the UE's power consumption. In other words, the UE may enter a DRX long cycle immediately following an instance of sending an indication such as a MAC control element requesting a transition from a DRX short cycle to a DRX long cycle or a PPI indication as 'lowPowerConsumption' to the NW, at least in some embodiments.

Default/Pre-Configured Configuration:

According to the current art, at least in some instances when a UE toggles between PPI ON/OFF (e.g., where PPI ON is taken to mean "lowPowerConsumption" and PPI OFF is taken to mean "normal" configuration), the NW needs to send explicit messages to change the configuration. This may lead to a large amount of signaling in the case of frequent PPI ON/OFF from many UEs.

In order to reduce the signaling burden, it may be possible for the NW to provide a default or pre-configuration for power-optimized configuration. In this case, the default configuration may be implicitly assumed to be in place upon sending a request for a low-power configuration (e.g., sending a MAC control element or toggling of PPI ON) by a UE if no configuration response is provided by the NW. Thus, in such a scenario, a UE may be able to perform cellular communication with a cellular network according to the established default low-power configuration based on providing a low-power indicator to the cellular network. Note that it may be preferable for such a feature to be configured only when the indicator (e.g., MAC control element or PPI) is sent to NW reliably, e.g., in order to avoid confusion between the NW and the UE. This feature may help avoid frequent configuration from NW when UE keeps toggling between power configurations. Note that it may still be possible for non-default/custom configurations to be provided by the NW in response to a low-power indication in such a scenario if desired.

Consecutive Power Optimal Configuration Indication:

According to current art, at least in some instances a UE may not be permitted to send more than one PPI indication with the same preference consecutively. There maybe certain disadvantages to a UE being unable to send the same PPI indication multiple times consecutively. As one possible disadvantage, a UE may not be able to choose the optimal power configuration in an incremental (e.g., step by step) manner. For example, if there is more than one configuration which can give incremental power performance, UE may not be able to make use of that, and may instead only have one opportunity to indicate a optimal configuration. As another disadvantage, after a UE sends a PPI ON indication, if at a later point in time if the NW moves the UE to a 'normal' configuration (e.g., based on data, etc.), UE may not be able to send the PPI as ON again and move to power optimal configuration based on the latest configuration, e.g., since the current specification documents may specify that the PPI indication may only be different from the last indicated one.

However, it may be possible (e.g., in a proprietary implementation or according to a specification change) for a UE to send the PPI indication with the same preference/value more than once consecutively. This may indicate an incremental change in the power configuration settings, and/or may indicate a preference for a low power configuration corresponding to a different type of communication scenario.

Application Aware UE Configuration:

Traffic pattern varies from application to application, and due to vast variety of the applications, a single configuration or a few configurations may not suit and all the applications and all the UEs. Below is a list of options that can provide benefits, e.g., for better power performance, at least according to some embodiments.

In the current art, at least in some instances the NW may provide a configuration to a UE and the UE may follow the provided configuration. But it may be advantageous if the NW shares a set of possible configurations with the UE, the UE selects one of them (e.g., based on the traffic at the UE), and the UE communicates the selection to the NW.

Thus, according to some embodiments, the NW may share a set of possible configurations with a UE, each configuration of which may include any or all of DRX settings, PUCCH, SRS, SR, RRC inactivity timer, etc. The UE, based on the current traffic/application at the UE (e.g., as indicated from the AP of the UE to the BB of the UE), may choose a configuration among those shared, and communicate it to the NW. The UE and the NW may subsequently follow the chosen configuration.

Additionally, or alternatively, the NW may share a further set of possible configurations (or include further parameters in the set of configurations), which may include but are not limited to DRX and/or RRC inactive timers, OnDuration, short DRX cycle timer, etc. Similarly, the UE may choose one (or more, if multiple types of configuration groups are shared) of them based on the traffic and/or application at the UE.

Note that certain applications may be more sensitive to inactivity timers such as the DRX inactivity timer and the RRC inactivity timer. Thus, a UE may be able to customize the inactivity timers based on the application running and communicate these customized options to the NW. Optionally, a UE may also customize the OnDuration based on the application/traffic that is running, if desired.

As a further possibility, a UE may select the parameters or configuration settings itself and communicate its selections (e.g., again based at least in part on traffic and/or application at the UE) to the NW.

Early DRX Entry

While many applications' characterization may reveal that a higher inactivity timer gives good performance, there may also be occasions on which a UE does not have traffic while the inactivity timer is still running. In such cases, if the UE can enter DRX early, the UE may experience better power performance, at least in some instances.

To do this, a UE might communicate in UL an indication or request to enter into DRX mode 'early' (i.e., before expiration of the inactivity timer). Currently it may be the case that only the NW can ask the UE to enter DRX (e.g., by MAC DRX command) and the UE may not have a facility to communicate its willingness to enter DRX mode early.

Figure 16:
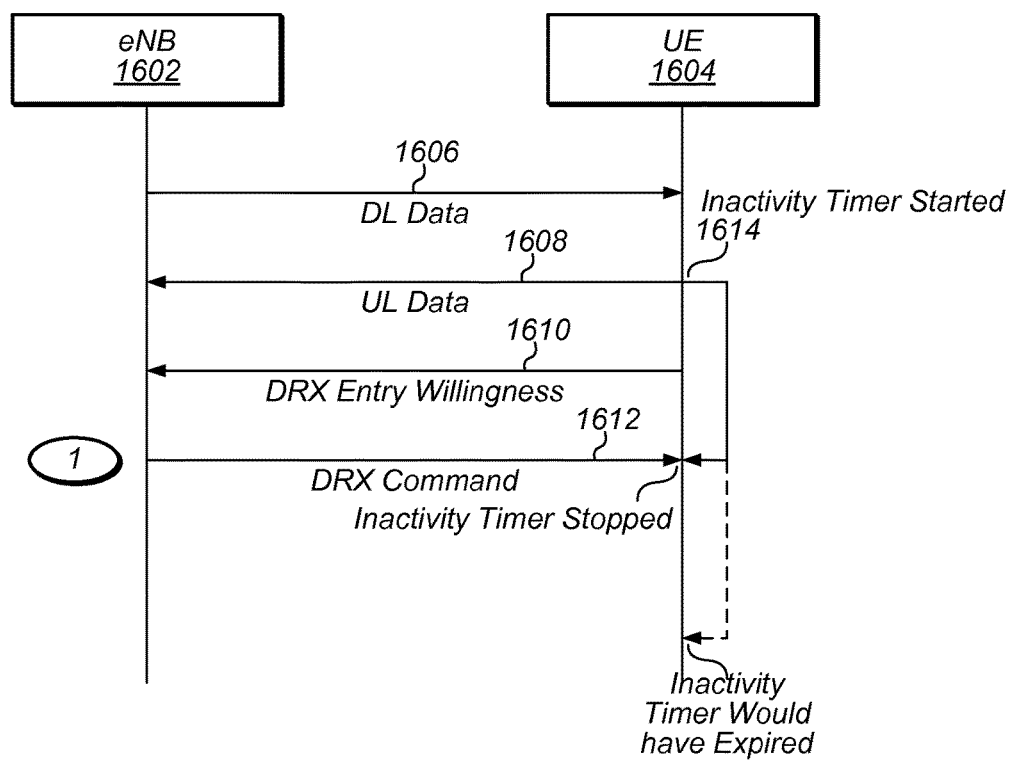

It may be possible, however, to define a command or indication for requesting early DRX entry which a UE may communicate to the NW. FIG. 16 illustrates the use of such a command. In such a case, a UE 1604 may communicate downlink data 1606 and/or uplink data 1608 with the NW (e.g., via eNB 1602). After such data communication, in 1614 an inactivity timer may be initiated. Upon determining it is willing to enter DRX early (which may be based on information from the AP and/or based on any of a variety of other reasons), the UE 1604 may communicate an indication 1610 to the NW (e.g., via eNB 1602) of the UE 1604's willingness to enter DRX mode before the inactivity timer expires. Upon receiving this indication 1610, the NW may send a DRX command 1612 to the UE, or if desired the UE may implicitly move to DRX mode on the expectation that the NW will receive this indication. This indication can be sent by the UE to NW in either a MAC control element or an RRC message, though it may be preferable in some instances to use a MAC control element, since the existing DRX command by which the NW can ask UE to enter DRX is a MAC CE. Thus, the UE 1604 may stop the inactivity timer and enter DRX prior to the time when the inactivity timer would have expired.

As a further feature, it may be possible for a UE to communicate the application info/type(s) and/or the class of data traffic currently active on the UE to the NW, and for the NW to configure the UE's network configuration parameters in a manner specific to or at least partially based upon the application(s) and/or the requested class.

As a yet further feature, PPI indications may be provided/configured on a per bearer and/or Application and/or QCI class and/or class of data traffic for the configured bearers of a given UE.

Note that the various features described in the present disclosure may be implemented individually or in any combination, as desired.

In the following further exemplary embodiments are provided.

One set of embodiments may include a method, comprising: by a cellular base station (BS): receiving an indication of one or more types of upcoming data traffic from each of a plurality of wireless user equipment (UE) devices; scheduling upcoming radio resource control (RRC) connections for each of the plurality of UEs based at least in part on the indication of one or more types of upcoming data traffic received from each of the plurality of UEs; and transmitting indications of the scheduled upcoming RRC connections to each of the plurality of UEs.

In some embodiments, the method further comprises: establishing RRC connections with the plurality of UEs according to the scheduling of upcoming RRC connections for each of the plurality of UEs; and communicating data with the plurality of UEs using the established RRC connections.

In some embodiments, the scheduled RRC connections are established in a network initiated manner.

In some embodiments, the method further comprises: transmitting an indication of one or more types of data traffic to be transmitted in conjunction with each scheduled upcoming RRC connection to each of the plurality of UEs, wherein communicating data with the plurality of UEs using the established RRC connections comprises, for each RRC connection with a respective UE, receiving the indicated one or more types of data traffic.

In some embodiments, each indication of one or more types of upcoming data traffic comprises a scheduling window indicating delay sensitivity for each type of upcoming data traffic.

In some embodiments, scheduling upcoming RRC connections is also based at least in part on one or more of: a current schedule of the BS; or predicted future loads of the BS.

Another set of embodiments may include a network element, comprising: a network interface; and a processing element operably coupled to the network interface; wherein the processing element and the network interface are configured to: receive an indication of one or more types of upcoming data traffic from a wireless user equipment (UE) device; schedule a radio resource control connection (RRC) for the UE based at least in part on the indication of one or more types of upcoming data traffic; and provide an indication of the scheduled RRC connection to the UE.

According to some embodiments, the processing element and the network interface are further configured to: page the UE at a time of the scheduled RRC connection; establish an RRC connection with the UE based on paging the UE; and communicate data with the UE using the established RRC connection.

According to some embodiments, the indication of the scheduled RRC connection further indicates a type of data traffic associated with the scheduled RRC connection.

In some embodiments, the indication of one or more types of upcoming data traffic indicates one or more priority levels associated with the upcoming data traffic.

In some embodiments, the indication of one or more types of upcoming data traffic indicates one or more application types associated with the upcoming data traffic.

In some embodiments, the indication of one or more types of upcoming data traffic further indicates a scheduling window indicating delay sensitivity for each type of upcoming data traffic.

In some embodiments, timing of the scheduled RRC connection for the UE is further based at least in part on estimated network loading.

According to some embodiments, the network element comprises one of: a cellular base station; a mobility management entity; or a gateway.

Yet another set of embodiments may include a wireless user equipment (UE) device comprising: a radio; and a processing element; wherein the radio and the processing element are configured to: transmit an indication of one or more types of upcoming data traffic to a cellular base station (BS); and receive an indication of a scheduled upcoming RRC connection from the BS, wherein a type of data traffic to be transmitted is indicated in conjunction with the scheduled upcoming RRC connection.

According to some embodiments, the indication of a scheduled upcoming RRC connection indicates a time of the scheduled upcoming RRC connection, wherein the radio and the processing element are further configured to: enter a sleep mode until the time of the scheduled upcoming RRC connection; wake up at the time of the scheduled upcoming RRC connection; establish the scheduled RRC connection; communicate data traffic of the indicated type of data traffic to be transmitted with the BS via the RRC connection.

In some embodiments, the one or more types of upcoming data traffic indicated comprise one or more of: one or more quality of service (QoS) classes; one or more application types; one or more priority levels.

In some embodiments, the radio and the processing element are further configured to: monitor application traffic patterns of user data of the UE; and determining application priority levels for a plurality of application types based on monitoring application traffic patterns of user data of the UE, wherein the indication of one or more types of upcoming data traffic is generated based at least in part on determining application priority levels for the plurality of application types.

In some embodiments, the indication of the scheduled upcoming RRC connection further comprises an indication of an RRC connection type and/or one or more RRC connection parameters of the scheduled upcoming RRC connection.

In some embodiments, the indication of one or more types of upcoming data traffic comprises one of: a media access control (MAC) control element (CE); a RRC information element (IE); or a non-access stratum (NAS) message.

A further set of embodiments may include a method, comprising: by a wireless user equipment (UE) device: performing a handshake mechanism with a cellular base station (BS), wherein the handshake mechanism establishes that the BS and the UE support a load-based-delay feature; providing an indication to the BS to enable the load-based-delay feature, wherein according to the load-based-delay feature the BS buffers downlink traffic until an uplink scheduling request is received by the BS from the UE; and selecting uplink scheduling request timing at least in part based on estimated load at the BS in response to enabling the load-based-delay feature.

According to some embodiments, the method further comprises: determining to provide the indication to enable the load-based-delay feature based at least in part on one or more of: current application type of application data traffic; current uplink activity; or estimated current downlink activity.

In some embodiments, the method further comprises: providing an uplink scheduling request to the BS; sleeping between providing the uplink scheduling request to the BS and a next C-DRX cycle on-duration based at least in part on the load-based-delay feature being enabled, wherein according to the load-based-delay feature the BS does not provide an uplink grant to the UE in response to the uplink scheduling request before the next C-DRX cycle on-duration.

In some embodiments, performing the handshake mechanism with the BS further comprises: providing an indication that the UE supports the load-based-delay feature during RRC connection establishment between the UE and the BS; and receiving an indication that the BS supports the load-based-delay feature during RRC connection establishment between the UE and the BS.

In some embodiments, the indication to enable the load-based-delay feature comprises a media access control (MAC) control element (CE).

According to some embodiments, the method further comprises: receiving an indication of a traffic type from an application processor of the UE at a baseband processor of the UE; and determining a degree of delay sensitivity of the traffic type, wherein the indication to enable the load-based-delay feature is provided based at least in part on determining that the degree of delay sensitivity of the traffic type is below a delay sensitivity threshold.

According to some embodiments, selecting uplink scheduling request timing at least in part based on estimated load at the BS further comprises: estimating loading of the base station; and transmitting an uplink scheduling request if estimated loading of the base station is below a threshold, wherein uplink data is buffered by the UE if estimated loading of the base station is above the threshold.

Another set of embodiments may include a wireless user equipment (UE) device, comprising: a radio; and a processing element; wherein the radio and the processing element are configured to: establish a radio resource control (RRC) connection with a cellular base station (BS); determine a delay sensitivity level of current application traffic between the UE and the BS; enable a load-based-delay feature if the delay sensitivity level of the current application traffic between the UE and the BS is below a delay sensitivity threshold; estimate loading of the BS while the load-based-delay feature is enabled; and buffer uplink application data traffic if estimated loading of the BS is above a loading threshold while the load-based-delay feature is enabled;

In some embodiments, according to the load-based-delay feature the UE buffers uplink application data traffic until one of: estimated loading of the BS is below the loading threshold; a buffer fullness threshold is exceeded; or a data buffering timer expires.

According to some embodiments, the radio and the processing element are further configured to: disable the load-based-delay feature if the delay sensitivity level of the current application traffic between the UE and the BS is above the delay sensitivity threshold.

According to some embodiments, the radio and the processing element are further configured to: transmit an uplink scheduling request for the uplink application data traffic if estimated loading of the BS is below the loading threshold; sleep between transmitting the uplink scheduling request to the BS and a next C-DRX cycle on-duration based at least in part on the load-based-delay feature being enabled.

In some embodiments, establishing the RRC connection with the BS comprises exchanging information with the BS indicating that each of the UE and the BS support the load-based-delay feature; and enabling the load-based-delay feature comprises providing an indication to the BS to enable the load-based-delay feature.

In some embodiments, the radio and the processing element are further configured to: monitor control information provided by the base station to determine a number of downlink assignments provided by the base station over a predetermined period of time; and estimate loading of the BS based at least in part on determining the number of downlink assignments provided by the base station over the predetermined period of time.

A further set of embodiments may include a cellular base station (BS), comprising: a radio; and a processing element; wherein the radio and the processing element are configured to: perform a handshake mechanism with a wireless user equipment (UE) device, wherein the handshake mechanism establishes that the BS and the UE support a load-based-delay feature; receive an indication from the UE to enable the load-based-delay feature; and buffer downlink traffic for the UE based at least in part on the indication to enable the load-based-delay feature.

In some embodiments, according to the load-based-delay feature the BS buffers downlink traffic for the UE until an uplink scheduling request is received by the BS from the UE, unless a buffer fullness threshold is exceeded or a data buffering timer expires.

In some embodiments, the radio and the processing element are further configured to: receive an uplink scheduling request from the UE; provide an uplink grant to the UE in response to the uplink scheduling request; and provide a downlink grant to the UE in response to receiving the uplink scheduling request based at least in part on having buffered downlink traffic for the UE and based on the load-based-delay feature being enabled.

According to some embodiments, the radio and the processing element are further configured to: initiate a timer based on buffering the downlink traffic for the UE; and provide a downlink grant to the UE based on expiration of the timer if no uplink scheduling request is received from the UE before expiration of the timer.

In some embodiments, the radio and the processing element are further configured to: determine that a data buffer fullness threshold at the BS is exceeded; and provide a downlink grant to the UE based on determining that the data buffer fullness threshold at the BS is exceeded.

According to some embodiments, the radio and the processing element are further configured to: receive an uplink scheduling request from the UE; and wait to provide an uplink grant to the UE in response to the uplink scheduling request at least until a next C-DRX cycle on-duration of the UE based on a low-power preference indication.

In some embodiments, to perform the handshake mechanism with the UE, the radio and the processing element are further configured to: receive an indication that the UE supports the load-based-delay feature in a radio resource control (RRC) message from the UE; and provide an indication that the BS supports the load-based-delay feature in a RRC message to the UE.

Yet another set of embodiments may include a wireless user equipment (UE) device, comprising: a radio; a baseband processor (BB) operatively coupled to the radio; and an application processor (AP) operatively coupled to the BB; wherein the UE is configured to: determine, by the AP, an amount of time until next uplink and/or downlink application data is expected; provide, by the AP, an indication of the determined amount of time to the BB; modify, by the BB, timing of one or more of a transmit operation or a receive operation based at least in part on the indication of the determined amount of time.

In some embodiments, modifying timing of one or more of a transmit operation or a receive operation comprises skipping one or more DRX cycle on-durations based on the indication of the determined amount of time.

In some embodiments, the UE is further configured to: determine, by the BB, a next wakeup time of the BB; provide, by the BB, an indication of the determined next wakeup time to the AP; modify, by the AP, timing of sending application data to the BB based at least in part on the indication of the determined next wakeup time.

In some embodiments, the UE is further configured to: provide a request to a cellular base station (BS) for early DRX entry, wherein the request is provided prior to expiration of a DRX inactivity timer for the UE; and enter a DRX mode prior to expiration of the DRX inactivity timer based at least in part on request for early DRX entry.

According to some embodiments, the UE is further configured to: receive, by the BB, a response to the request for early DRX entry from the BS, wherein the response indicates to the UE to enter the DRX mode, wherein entering the DRX mode prior to expiration of the DRX inactivity timer is also based at least in part on the response to the request for early DRX entry.

In some embodiments, the UE is further configured to: provide a request to a cellular base station (BS) to transition from a DRX short cycle to a DRX long cycle, wherein the request is provided prior to expiration of a DRX short cycle timer for the UE; and transition from the DRX short cycle to the DRX long cycle prior to expiration of the DRX short cycle timer based at least in part on the request to transition from the DRX short cycle to the DRX long cycle.

In some embodiments, the UE is further configured to: receive a set of possible configurations from a base station (BS), wherein the each possible configuration of the set of possible configurations comprises configuration settings for each of a plurality of configuration parameters, wherein the plurality of configuration parameters comprise one or more of: physical uplink control channel (PUCCH) configuration parameters; sounding reference symbol (SRS) configuration parameters; scheduling request (SR) configuration parameters; RRC inactivity timer settings; DRX inactivity timer settings; short DRX cycle timer settings; DRX OnDuration settings; other DRX settings; provide an indication of a selected configuration from the set of possible configurations to the BS; and perform cellular communication with the BS according to the selected configuration.

According to some embodiments, the UE is further configured to: receive, by the BB, first application data from a cellular base station (BS) in a wireless manner; provide, by the BB, the first application data to the AP; generate, by the BB, control information in response to receiving the application data from the BS; initiate, at the BB, a timer based at least in part on receiving the application data from the BS; provide, by the BB, the control information to the BS bundled with second application data prior to expiration of the timer if the second application data is received from the AP prior to expiration of the timer; and provide, by the BB, the control information to the BS upon expiration of the timer if no application data is received from the AP prior to expiration of the timer.

According to some embodiments, the UE is further configured to: establish a default low-power configuration with a cellular network, wherein the default low-power configuration specifies default configuration settings if a low-power indicator is enabled for the UE for one or more configuration parameters; provide a low-power indicator to the cellular network; and perform cellular communication with the cellular network according to the default low power configuration based on providing the low-power indicator to the cellular network.

A further set of embodiments may include a method, comprising: by an application layer of a wireless user equipment (UE) device: receiving an indication of a determined next wakeup time of a baseband layer of the UE; and selecting timing of sending application data to the baseband layer of the UE for network communication based at least in part on the indication of the determined next wakeup time of the baseband layer of the UE, wherein timing of sending application data to the baseband layer of the UE is selected to coordinate sending application data to the baseband layer of the UE with the determined next wakeup time of the baseband layer of the UE.

In some embodiments, the method further comprises: determining an amount of time until a next expected network communication of application data; and providing an indication of the determined amount of time to the baseband layer of the UE.

In some embodiments, the method further comprises: providing an indication of one or more application data types currently active at the application layer of the UE to the baseband layer of the UE.

A still further set of embodiments may include a method, comprising: by a baseband layer of a wireless user equipment (UE) device: receiving an indication of an amount of time until next uplink and/or downlink application data is expected by an application layer of the UE from the application layer of the UE; and selecting timing of one or more of a next transmit operation or a next receive operation based at least in part on the indication of the determined amount of time.

In some embodiments, selecting timing of one or more of a next transmit operation or a next receive operation based at least in part on the indication of the determined amount of time further comprises: skipping one or more DRX cycle on-durations based on the indication of the determined amount of time if the determined amount of time is greater than an amount of time until a next DRX cycle on-duration.

In some embodiments, the method further comprises: determining a next wakeup time of the baseband layer of the UE; and providing an indication of the determined next wakeup time of the baseband layer of the UE to the application layer of the UE.

According to some embodiments, the method further comprises: providing a request for early DRX entry to a cellular base station (BS) based at least in part on information received from the application layer of the UE, wherein the request is provided prior to expiration of a DRX inactivity timer for the UE; and entering a DRX mode prior to expiration of the DRX inactivity timer based at least in part on request for early DRX entry.

According to some embodiments, the method further comprises: receiving a response to the request for early DRX entry from the BS, wherein the response indicates to the UE to enter the DRX mode, wherein the UE entering the DRX mode prior to expiration of the DRX inactivity timer is also based at least in part on the response to the request for early DRX entry.

According to some embodiments, the method further comprises: providing a request to transition from a DRX short cycle to a DRX long cycle to a cellular base station (BS) based at least in part on information received from the application layer of the UE, wherein the request is provided prior to expiration of a DRX short cycle timer for the UE; and transitioning from the DRX short cycle to the DRX long cycle prior to expiration of the DRX short cycle timer based at least in part on the request to transition from the DRX short cycle to the DRX long cycle.

According to some embodiments, the request is provided to the BS using one of: a media access control (MAC) control element (CE); a power preference indicator (PPI) bit; or a radio resource control (RRC) information element (IE).

In some embodiments, the method further comprises: receiving a set of possible configurations from a base station (BS), wherein the each possible configuration of the set of possible configurations comprises configuration settings for each of a plurality of configuration parameters; providing an indication of a selected configuration from the set of possible configurations to the BS; and performing cellular communication with the BS according to the selected configuration.

According to some embodiments, the method further comprises: receiving an indication of one or more application data types currently active at the application layer of the UE; and selecting a configuration from the set of possible configurations based at least in part on the one or more application data types currently active at the application layer of the UE.

Another set of embodiments may include a method, comprising: receiving, at a cellular base station (BS), indications of types of upcoming data traffic from each of a plurality of wireless user equipment (UE) devices; scheduling upcoming radio resource control (RRC) connections for each of the plurality of UEs based at least in part on the indications of types of upcoming data traffic; and transmitting indications of the scheduled upcoming RRC connections to each of the plurality of UEs, wherein a type of data traffic to be transmitted is indicated in conjunction with each scheduled upcoming RRC connection.

According to some embodiments, each indication comprises a scheduling window indicating delay sensitivity for each type of upcoming data traffic.

According to some embodiments, scheduling upcoming RRC connections is also based at least in part on a current schedule of the BS and predicted future loads of the BS.

A further set of embodiments may include a method, comprising: performing, by a cellular base station (BS), a handshake mechanism with a wireless user equipment (UE) device, wherein the handshake mechanism establishes that the BS and the UE support a load-based-delay feature; receiving, by the BS, an indication from the UE to enable the load-based-delay feature; buffering, by the BS, downlink traffic for the UE until an uplink scheduling request is received by the BS from the UE based on the indication to enable the load-based-delay feature, wherein the UE selects uplink scheduling request timing at least in part based on an estimation of load of the BS.

According to some embodiments, the indication to enable the load-based-delay feature is based at least partially on one or more of: current application type of application data traffic; current uplink activity; or estimated current downlink activity.

According to some embodiments, the method further comprises: receiving, by the BS, an uplink scheduling request from the UE; and waiting to provide an uplink grant to the UE in response to the uplink scheduling request at least until a next C-DRX cycle on-duration of the UE based on a low-power preference indication, wherein the UE is configured to sleep between providing the uplink scheduling request to the BS and a next C-DRX cycle on-duration.

Yet another set of embodiments includes a method, comprising: providing, by a base station (BS), a set of possible configurations to a wireless user equipment (UE) device, wherein the each possible configuration of the set of possible configurations comprises configuration settings for each of a plurality of configuration parameters, wherein the plurality of configuration parameters comprise one or more of: physical uplink control channel (PUCCH) configuration parameters; sounding reference symbol (SRS) configuration parameters; scheduling request (SR) configuration parameters; RRC inactivity timer settings; DRX inactivity timer settings; short DRX cycle timer settings; DRX OnDuration settings; other DRX settings; receiving, by the BS, an indication of a selected possible configuration from the set of possible configurations from the UE; performing, by the BS, cellular communication with the UE according to the selected possible configuration.

A still further set of embodiments includes a method, comprising: receiving, by a cellular base station (BS), a request for early DRX entry from a wireless user equipment (UE) device, wherein the request is provided prior to expiration of a DRX inactivity timer for the UE; providing, by the BS, a response to the request for early DRX entry to the UE, wherein the response indicates to the UE to enter a DRX mode, wherein the UE is configured to enter the DRX mode prior to expiration of the DRX inactivity timer based on the response to the request for early DRX entry.

An additional exemplary set of embodiments includes a cellular base station (BS), comprising: a radio; and a processing element operably coupled to the radio; wherein the BS is configured to implement any of the method elements of any of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Another set of embodiments includes a method, comprising: transmitting, by a wireless user equipment (UE) device, an indication of types of upcoming data traffic to a cellular base station (BS), wherein the BS schedules upcoming radio resource control (RRC) connections for each of a plurality of UEs based at least in part on indications of types of upcoming data traffic classes from each of the plurality of UEs; receiving an indication of a scheduled upcoming RRC connection from the BS, wherein a type of data traffic and/or class of traffic to be transmitted is indicated in conjunction with the scheduled upcoming RRC connection.

According to some embodiments, the indication of a scheduled upcoming RRC connection indicates a time of the scheduled upcoming RRC connection, wherein the method further comprises: entering a sleep mode until the time of the scheduled upcoming RRC connection; waking up at the time of the scheduled upcoming RRC connection; establishing the scheduled RRC connection; communicating data traffic of the indicated type of data traffic to be transmitted via the RRC connection.

A yet further set of embodiments includes a method, comprising: performing, by a wireless user equipment (UE) device, a handshake mechanism with a cellular base station (BS), wherein the handshake mechanism establishes that the BS and the UE support a load-based-delay feature; providing an indication from the UE to the BS to enable the load-based-delay feature, wherein the BS buffers downlink traffic until an uplink scheduling request is received by the BS from the UE based on the indication to enable the load-based-delay feature; selecting, by the UE, uplink scheduling request timing at least in part based on estimated load at the BS.

According to some embodiments, the indication to enable the load-based-delay feature is based at least partially on one or more of: current application type of application data traffic; current uplink activity; or estimated current downlink activity.

According to some embodiments, the method further comprises: providing an uplink scheduling request from the UE to the BS; sleeping, by the UE, between providing the uplink scheduling request to the BS and a next C-DRX cycle on-duration, wherein the BS is configured to not provide an uplink grant to the UE in response to the uplink scheduling request before the next C-DRX cycle on-duration based on a low-power preference indication.

An even further set of embodiments includes a method, comprising: receiving, by a wireless user equipment (UE) device, a set of possible configurations from a base station (BS), wherein the each possible configuration of the set of possible configurations comprises configuration settings for each of a plurality of configuration parameters, wherein the plurality of configuration parameters comprise one or more of: physical uplink control channel (PUCCH) configuration parameters; sounding reference symbol (SRS) configuration parameters; scheduling request (SR) configuration parameters; RRC inactivity timer settings; DRX inactivity timer settings; short DRX cycle timer settings; DRX OnDuration settings; other DRX settings; providing, by the UE, an indication of a selected possible configuration from the set of possible configurations to the BS; performing, by the UE, cellular communication with the BS according to the selected possible configuration.

Yet a further set of embodiments may include a method, comprising: providing, by a wireless user equipment (UE) device, a request for early DRX entry to a cellular base station (BS), wherein the request is provided prior to expiration of a DRX inactivity timer; entering, by the UE, a DRX mode prior to expiration of the DRX inactivity timer based at least in part on request for early DRX entry.

According to some embodiments, the method further comprises: receiving, by the UE, a response to the request for early DRX entry from the BS, wherein the response indicates to the UE to enter the DRX mode, wherein the UE entering the DRX mode prior to expiration of the DRX inactivity timer is also based at least in part on the response to the request for early DRX entry.

An additional exemplary set of embodiments may include a wireless user equipment (UE) device, comprising: a radio; and an processing element operably coupled to the radio; wherein the UE is configured to implement any of the method elements of any of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment device (UE), comprising:
a radio;
a baseband processor (BB) operatively coupled to the radio; and
an application processor (AP) operatively coupled to the BB;
wherein the UE is configured to:
determine, by the AP, an amount of time until next uplink and/or downlink application data is expected;
provide, by the AP, an indication of the determined amount of time to the BB;
modify, by the BB, timing of one or more of a transmit operation or a receive operation based at least in part on the indication of the determined amount of time, wherein modifying timing of one or more of a transmit operation or a receive operation comprises skipping one or more DRX cycle on-durations;
receive, by the BB, first application data from a cellular base station (BS) in a wireless manner;
provide, by the BB, the first application data to the AP;
generate, by the BB, control information in response to receiving the application data from the BS;
initiate, at the BB, a timer based at least in part on receiving the application data from the BS;
provide, by the BB, the control information to the BS bundled with second application data prior to expiration of the timer if the second application data is received from the AP prior to expiration of the timer; and
provide, by the BB, the control information to the BS upon expiration of the timer if no application data is received from the AP prior to expiration of the timer.

2. The UE of claim 1,
wherein modifying timing of one or more of a transmit operation or a receive operation comprises skipping one or more DRX cycle on-durations if the determined amount of time is greater than an amount of time until a next DRX cycle on-duration.

3. The UE of claim 1, wherein the UE is further configured to:
determine, by the BB, a next wakeup time of the BB;
provide, by the BB, an indication of the determined next wakeup time to the AP;
modify, by the AP, timing of sending application data to the BB based at least in part on the indication of the determined next wakeup time.

4. The UE of claim 1, wherein the UE is further configured to:
provide a request to a cellular base station (BS) for early short or long DRX entry, wherein the request is provided prior to expiration of a DRX inactivity timer for the UE;
enter a short or long DRX mode prior to expiration of the DRX inactivity timer based at least in part on the request for early short or long DRX entry.

5. The UE of claim 4, wherein the UE is further configured to:
receive, by the BB, a response to the request for early short or long DRX entry from the BS, wherein the response indicates to the UE to enter the short or long DRX mode,
wherein entering the short or long DRX mode prior to expiration of the DRX inactivity timer is also based at least in part on the response to the request for early short or long DRX entry.

6. The UE of claim 1, wherein the UE is further configured to:
provide a request to a cellular base station (BS) to transition from a DRX short cycle to a DRX long cycle, wherein the request is provided prior to expiration of a DRX short cycle timer for the UE;
transition from the DRX short cycle to the DRX long cycle prior to expiration of the DRX short cycle timer based at least in part on the request to transition from the DRX short cycle to the DRX long cycle.

7. The UE of claim 1, wherein the UE is further configured to:
receive a set of possible configurations from a base station (BS), wherein each possible configuration of the set of possible configurations comprises configuration settings for each of a plurality of configuration parameters, wherein the plurality of configuration parameters comprise one or more of:
physical uplink control channel (PUCCH) configuration parameters;
sounding reference symbol (SRS) configuration parameters;
scheduling request (SR) configuration parameters;
RRC inactivity timer settings;
DRX inactivity timer settings;
short DRX cycle timer settings;
DRX OnDuration settings;
other DRX settings;
provide an indication of a selected configuration from the set of possible configurations to the BS;
perform cellular communication with the BS according to the selected configuration.

8. The UE of claim 1, wherein the UE is further configured to:
establish a default low-power configuration with a cellular network, wherein the default low-power configuration specifies default configuration settings if a low-power indicator is enabled for the UE for one or more configuration parameters;
provide a low-power indicator to the cellular network; and
perform cellular communication with the cellular network according to the default low power configuration based on providing the low-power indicator to the cellular network.

9. A method, comprising:
by an application layer of a wireless user equipment device (UE):
receiving an indication of a determined next wakeup time of a baseband layer (BB) of the UE; and
selecting timing of sending application data to the baseband layer of the UE for network communication based at least in part on the indication of the determined next wakeup time of the BB,
wherein timing of sending application data to the BB is selected to coordinate sending application data to the BB with the determined next wakeup time of the BB; and by the BB:
receiving first application data from a cellular base station (BS) in a wireless manner;
providing the first application data to the AP;
generating control information in response to receiving the application data from the BS;
initiating a timer based at least in part on receiving the application data from the BS;
providing the control information to the BS bundled with second application data prior to expiration of the timer if the second application data is received from the AP prior to expiration of the timer; and
providing the control information to the BS upon expiration of the timer if no application data is received from the AP prior to expiration of the timer.

10. The method of claim 9, further comprising:
determining an amount of time until a next expected network communication of application data; and
providing an indication of the determined amount of time to the baseband layer of the UE.

11. The method of claim 9, further comprising:
providing an indication of one or more application data types currently active at the application layer of the UE to the baseband layer of the UE.

12. A method, comprising:
by a baseband layer of a wireless user equipment device (UE):
receiving an indication of an amount of time until next uplink and/or downlink application data is expected by an application layer of the UE from the application layer AP of the UE;
selecting timing of one or more of a next transmit operation or a next receive operation based at least in part on the indication of the determined amount of time, wherein selecting timing of one or more of a next transmit operation or a next receive operation comprises skipping one or more DRX cycle on-durations;
receiving first application data from a cellular base station (BS) in a wireless manner;
providing the first application data to the AP;
generating control information in response to receiving the application data from the BS;
initiating a timer based at least in part on receiving the application data from the BS;
providing the control information to the BS bundled with second application data prior to expiration of the timer if the second application data is received from the AP prior to expiration of the timer; and
providing the control information to the BS upon expiration of the timer if no application data is received from the AP prior to expiration of the timer.

13. The method of claim 12,
wherein selecting timing of one or more of a next transmit operation or a next receive operation based at least in part on the indication of the determined amount of time further comprises:
skipping one or more DRX cycle on-durations based on the indication of the determined amount of time if the determined amount of time is greater than an amount of time until a next DRX cycle on-duration.

14. The method of claim 12, further comprising:
determining a next wakeup time of the baseband layer of the UE; and
providing an indication of the determined next wakeup time of the baseband layer of the UE to the application layer of the UE.

15. The method of claim 12, further comprising:
providing a request for early short or long DRX entry to a cellular base station (BS) based at least in part on information received from the application layer of the UE, wherein the request is provided prior to expiration of a DRX inactivity timer for the UE;
entering a short or long DRX mode prior to expiration of the DRX inactivity timer based at least in part on the request for early short or long DRX entry.

16. The method of claim 12, further comprising:
providing a request to transition from a DRX short cycle to a DRX long cycle to a cellular base station (BS) based at least in part on information received from the application layer of the UE, wherein the request is provided prior to expiration of a DRX short cycle timer for the UE;
transitioning from the DRX short cycle to the DRX long cycle prior to expiration of the DRX short cycle timer based at least in part on the request to transition from the DRX short cycle to the DRX long cycle.

17. The method of claim 16, wherein the request is provided to the BS using one of:
a media access control (MAC) control element (CE);
a power preference indicator (PPI) bit; or
a radio resource control (RRC) information element (IE).

18. The method of claim 12, further comprising:
receiving a set of possible configurations from a base station (BS), wherein each possible configuration of the set of possible configurations comprises configuration settings for each of a plurality of configuration parameters;
providing an indication of a selected configuration from the set of possible configurations to the BS;
performing cellular communication with the BS according to the selected configuration.

19. The method of claim 18, further comprising:
receiving an indication of one or more application data types currently active at the application layer of the UE; and
selecting a configuration from the set of possible configurations based at least in part on the one or more application data types currently active at the application layer of the UE.

* * * * *